(12) United States Patent
Masuda

(10) Patent No.: US 6,697,181 B2
(45) Date of Patent: Feb. 24, 2004

(54) OPTICAL SCANNING DEVICE, IMAGE FORMING APPARATUS AND OPTICAL SCANNING METHOD

(75) Inventor: Koji Masuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 29 days.

(21) Appl. No.: 10/058,446

(22) Filed: Jan. 28, 2002

(65) Prior Publication Data

US 2002/0101642 A1 Aug. 1, 2002

Related U.S. Application Data

(62) Division of application No. 09/513,856, filed on Feb. 25, 2000, now Pat. No. 6,384,949.

(30) Foreign Application Priority Data

Feb. 25, 1999 (JP) ............................................ 11-048824
Aug. 26, 1999 (JP) ............................................ 11-239828

(51) Int. Cl.⁷ ............................................. G02B 26/08
(52) U.S. Cl. ..................... 359/196; 359/205; 359/212; 359/216
(58) Field of Search ................................ 359/196–226; 347/256–261; 235/462.22, 462.23, 462.32–462.39

(56) References Cited

U.S. PATENT DOCUMENTS

| 3,995,110 A | * | 11/1976 | Starkweather | 359/217 |
| 5,005,928 A | | 4/1991 | Suzuki et al. | |
| 5,055,653 A | | 10/1991 | Funami et al. | |
| 5,355,244 A | | 10/1994 | Suzuki et al. | |
| 5,386,105 A | * | 1/1995 | Quinn et al. | 235/462.22 |
| 5,459,601 A | | 10/1995 | Suzuki et al. | |
| 5,546,216 A | | 8/1996 | Suzuki | |
| 5,717,511 A | | 2/1998 | Suzuki | |
| 5,751,462 A | | 5/1998 | Shiraishi et al. | |
| 5,875,051 A | | 2/1999 | Suzuki et al. | |
| 6,384,949 B1 | * | 5/2002 | Suzuki | |

FOREIGN PATENT DOCUMENTS

| JP | 5-307151 | 11/1993 |
| JP | 6-148545 | 5/1994 |
| JP | 9-243945 A | 9/1997 |
| JP | 9-304714 A | 11/1997 |
| JP | 10-227992 A | 8/1998 |
| JP | 11-258544 A | 9/1999 |
| JP | 11-260144 A | 9/1999 |

OTHER PUBLICATIONS

Pending U.S. patent application 09/344,633 filed Jun. 25, 1999.

(List continued on next page.)

*Primary Examiner*—James Phan
(74) *Attorney, Agent, or Firm*—Greenberg Traurig, LLP; Eugene C. Rzucidlo; Joseph M. Manak

(57) ABSTRACT

A coupling lens couples a light flux from a light source to form a parallel light flux, a convergent light flux or a divergent light flux. An optical deflector includes a deflective reflection surface which deflects the light flux from the coupling lens at a uniform angular velocity. A scanning image-formation optical system converges the deflected light flux received from the optical deflector on a surface to be scanned to form a beam spot. The device scans the surface to be scanned with the beam spot at a uniform velocity. A depth increasing component, increases the depth of focus determined by the entire optical system of the device, on the optical path between the light source and the deflective reflection surface.

4 Claims, 20 Drawing Sheets

OTHER PUBLICATIONS

Pending U.S. patent application 09/060,769 filed Apr. 15, 1998.

Pending U.S. patent application 09/021,595 filed Feb. 10, 1998.

Pending U.S. patent application 08/927,892 filed Sep. 11, 1997.

Pending U.S. patent application 08/785,274 filed Jan. 21, 1997.

Pending U.S. patent application 09/177,658 filed Oct. 23, 1998.

Khan M. Iftekharuddin et al, "Gaussian–to–Bessel beam transformation using split refracting system". Applied Optics / vol. 32, No. 13 / May 1, 1993. Pp. 2252–2256.

R.W. Gerchberg et al. "A Practical Algorithm for the Determination of Phase from Image and Diffraction Plane Pictures" Optik vol. 35 (No. 2), pp. 237–246 (1972). (no month).

J. Kurnin, "Exact Solutions for nondiffracting beams. I. The scalar theory". vol. 4, No. 4/Apr. 1987/J. Opt. Soc. Am. A. pp. 651–654.

J. Durnin et al. "Diffraction–Free Beams". Physical Review Letters, vol. 58, Apr. 13, 1997, No. 15 pp. 1499–1501.

Satoshi Kawata, "Long–range laser–beam spot formation by an anixon prism", Proceedings of Spring Lecture of Applied Physics Society (1990), p. 829. (no month).

* cited by examiner (4B-4B SECTIONAL MAGNIFIED VIEW)

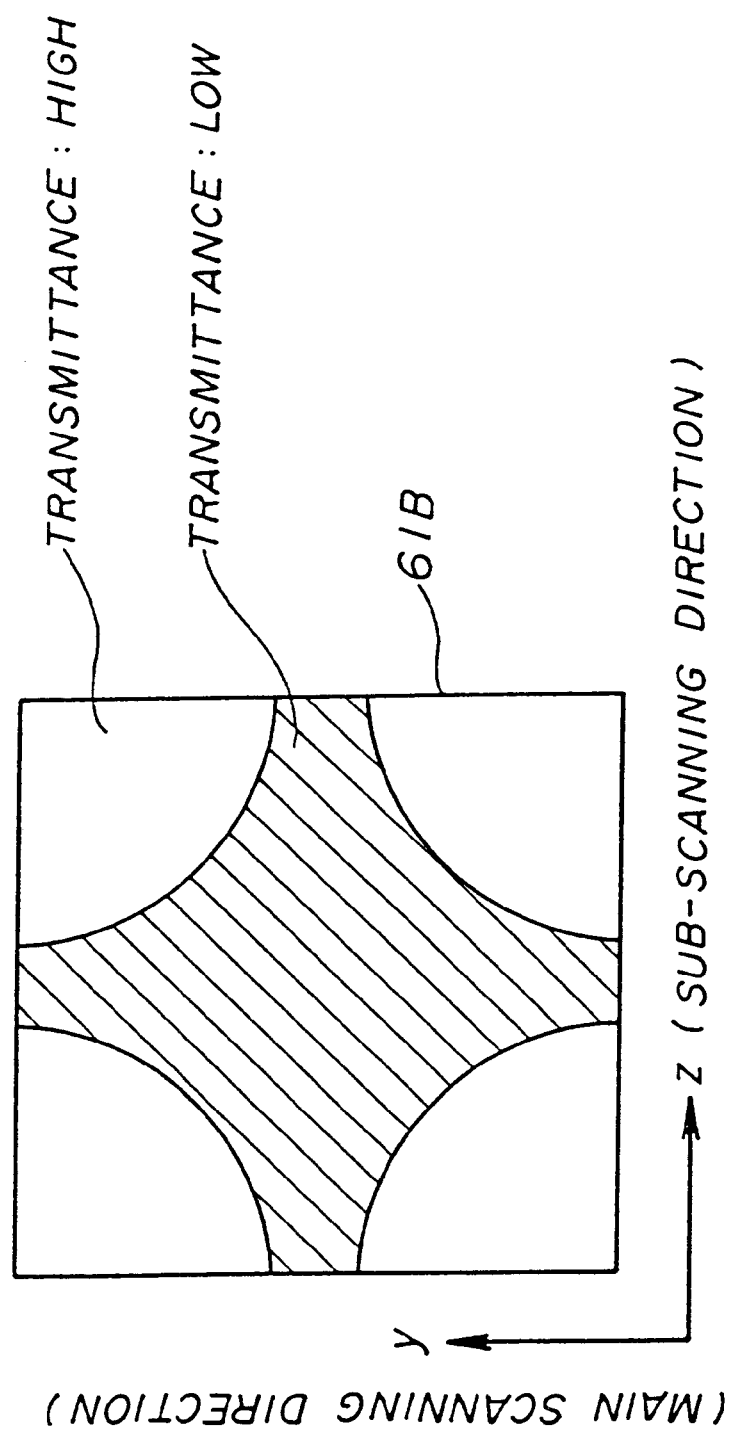

INTENSITY DISTRIBUTION ON PUPIL

BEAM SPOT ON IMAGE SURFACE

INTENSITY DISTRIBUTION ON PUPIL

BEAM SPOT ON IMAGE SURFACE

INTENSITY DISTRIBUTION ON PUPIL

BEAM SPOT ON IMAGE SURFACE

LSF

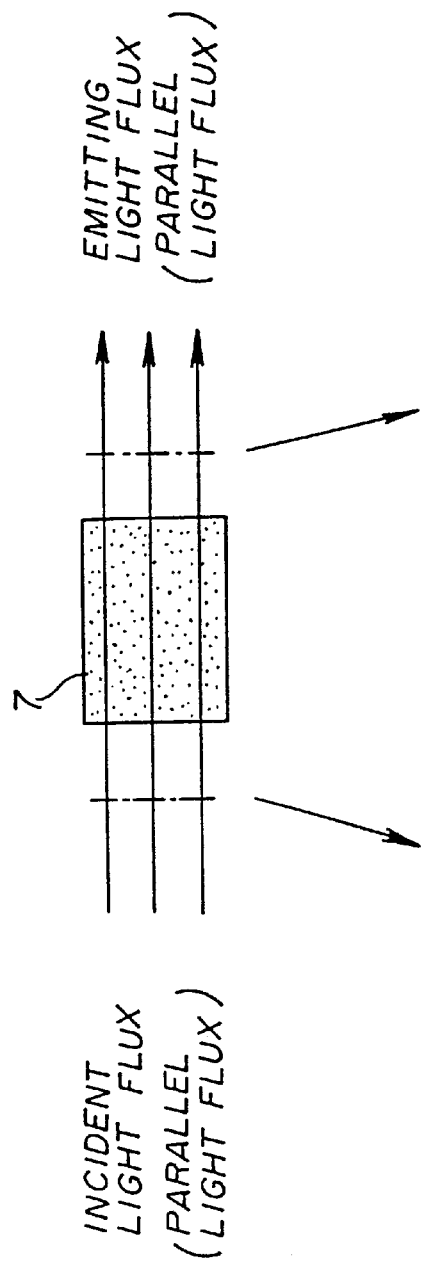

FIG.17A
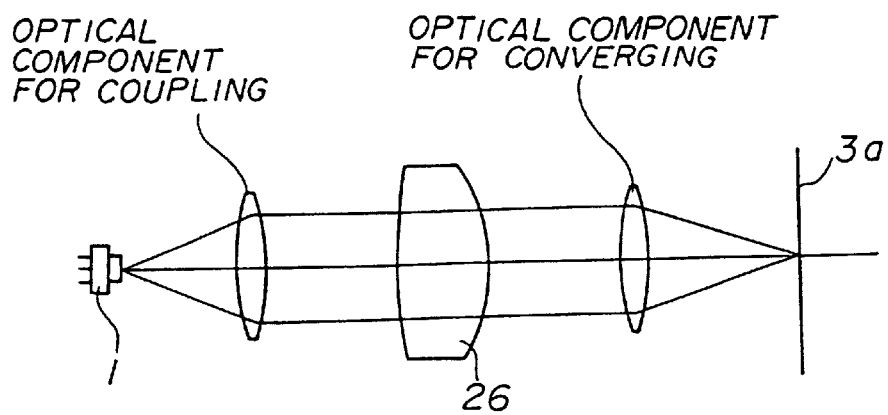
FIG.17B
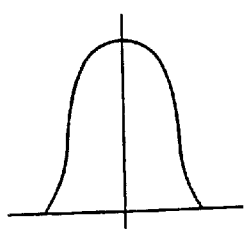
FIG.17C
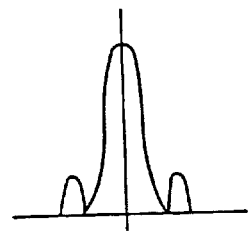
FIG.17D
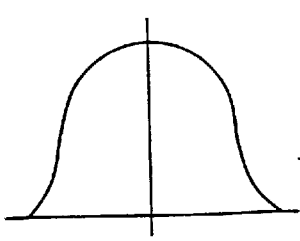
FIG.17E
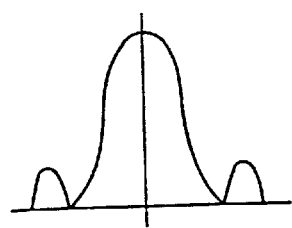
FIG.17F
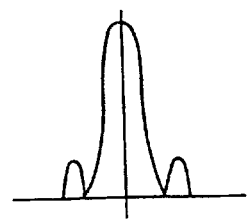

OPTICAL SCANNING DEVICE, IMAGE FORMING APPARATUS AND OPTICAL SCANNING METHOD

CROSS-REFERENCE TO RELATED APPLICATION

This application is a divisional of co-pending application No. 09/513,856 filed Feb. 25, 2000, U.S. Pat. No. 6,384,949.

BACKGROUND OF THE INVENTION

1. Field of the Invention

The present invention relates to an optical scanning device which is used as an optical writing device of a digital image forming device using an electrophotographic method such as a laser printer, a digital copier, a facsimile machine or other such method. The present invention further relates to an optical scanning device and an image forming apparatus including the optical scanning device which has an intensity distribution transforming optical component for transforming the intensity distribution of a light flux, and the image forming apparatus can be used in a digital outputting apparatus, for example, a digital copier, a printer, a facsimile machine or other apparatus.

2. Description of the Related Art

A conventional optical scanning device includes a coupling lens which couples a light flux emitted by a light source to form a parallel light flux, a weakly convergent light flux, or a weakly divergent light flux. An optical deflector deflects the light flux received from the coupling lens at a uniform angular velocity. A scanning image-formation optical system converges the light flux deflected by the optical deflector to form a beam spot on a surface to be scanned, i.e. a photosensitive body, and, thus, the surface to be scanned is scanned with the beam spot. Such an optical scanning device is used as an optical writing device in a digital image forming apparatus using the electrophotographic method such as a laser printer, a digital copier, a facsimile machine or other apparatus.

In such an optical scanning device, in order to achieve high-density writing (more than 1200 dpi, for example), it is necessary to form a beam spot having a sufficiently small diameter.

In order to obtain a beam spot having such a small diameter, it is necessary to increase the NA of the optical system of the optical scanning device. Further, in order to obtain a stable small-diameter beam spot, it is necessary that the optical system provides a large depth of focus which tolerates possible component allowance (the curvature radiuses, thicknesses, refractive indexes) for deviations of optical components of the optical system, mounting errors, and environment variations (temperature, humidity).

Assuming that the intensity distribution on the exit pupil of the optical system is a Gaussian distribution, the allowable degree of depth of focus 2 d is in proportion to the second power of the beam spot diameter w, as shown in the following expression:

$$2\,d \propto w^2/\lambda \tag{1}$$

In the above expression, $\lambda$ represents the used wavelength. Thus, the allowable degree of depth of focus decreases sharply as the beam spot diameter is reduced. Therefore, when reduction of the beam spot diameter is attempted, the allowable degree of depth of focus decreases, and, as a result, it is not possible to obtain a stable small-diameter beam spot when the above mentioned component allowance deviations or environmental variations occur.

One solution to this problem is to generate the zero-order Bessel beam of the first kind and obtain a beam spot having a large allowable degree of depth of focus.

For example, Japanese Laid-Open Patent Application No. 9-304714 discloses an optical system providing a large allowable degree of depth of focus by arranging a shading member having a shading portion which shades a portion of a light flux on an optical path between a light source and an optical deflector.

Further, Japanese Laid-Open Patent Application No. 10-227992 discloses generation of a Bessel beam having an intensity distribution which is approximately in proportion to the second power of the zero-order Bessel function of the first kind, in a system in which a laser beam is incident on a diffraction optical component consisting of a binary optical component having an optical performance approximately equivalent to a conical prism.

However, in each of these systems, the intensity distribution of the beam is axially symmetric. Therefore, when the system is used as an optical system of an optical scanning device, it is difficult to independently set a beam spot in a main scanning direction (in which scanning is performed with a light flux) and in a sub-scanning direction (perpendicular to the main scanning direction).

In the above-mentioned system, a Bessel beam is obtained as a result of transforming the distribution of the amplitude term $u_1(y_1, z_1)$ of the following equation (2) into an arbitrary amplitude distribution. The intensity distribution thereof is expressed by the second power of the amplitude distribution. In the following equation (2), the direction of the optical axis is coincident with the x direction, the main scanning direction perpendicular to the optical axis is coincident with the y direction and the sub-scanning direction also perpendicular to the optical axis is coincident with the z direction.

$$u_2(y_2, z_2) = \frac{je^{-ik\left(x + \frac{y_2^2 + z_2^2}{2x}\right)}}{\lambda x} \int\int u_1(y_1, z_1) e^{-i\frac{k}{x}(y_1 y_2 + z_1 z_2)} dy_1 dz_1 \tag{2}$$

The above equation (2) is expressed assuming that the intensity distribution $u_2 2\,(y_2, z_2)$ of the beam spot on the image surface is approximately in accordance with the Fraunhofer diffraction.

In the above equation (2):

$u_2\,(y_2, z_2)$: the amplitude distribution of the beam spot on the image surface;

$u_1\,(y_1, z_1)$: amplitude distribution on the pupil;

$-ik\,(y_1 y_2 + z_1 z_2)/2x$: phase difference on the pupil (k represents the wave number); and $j/\lambda$: Fresnel inclination coefficient (where X represents the used wavelength).

The expression of the Fraunhofer diffraction of the above equation (2) has the same meaning as that of Fourier transform expression, and the amplitude distribution $u_2\,(y_2, z_2)$ on the image surface is equal to that obtained from Fourier transform being performed on the amplitude distribution $u_1$ ($y_1$, $z_1$) on the pupil. Therefore, the expression of the Fraunhofer diffraction of the above equation (2) is referred to as a Fourier transformed image.

Further, in any method, when a Bessel beam is generated, side lobes develop. Therefore, when the sensitivity of the photosensitive body is high, image degradation such as resolution degradation and/or stain in background occurs.

FIGS. 1, 2A and 2B show an example of an optical scanning device according to the related art. FIG. 1 shows an optical arrangement of the optical scanning device. In FIGS. 2A and 2B, the optical scanning device is shown in a condition in which the optical scanning device is expanded along an optical path of a light flux extending from a light source to a surface to be scanned. FIG. 2A shows the sectional view of the optical scanning device taken along a deflection plane (including the plane formed as a result of the light flux scanning the surface to be scanned), and FIG. 2B shows the sectional view of the optical scanning device taken along the plane including the optical path of the light flux and perpendicular to the deflection plane.

As shown in FIGS. 1, 2A and 2B, the optical scanning device 30 includes a light source 1 which emits a laser light, a first optical system 2 for directing the laser light emitted by the light source 1 to an optical deflecting portion 3, the optical deflecting portion 3 which deflects the light flux from the first optical system 2, and a second optical system 4 for forming a beam spot on the surface 5 to be scanned using the thus-deflected light flux. The above-mentioned first optical system 2 includes a collimating lens 21, an aperture 22 and a cylindrical lens 23. The second optical system 4 includes a spherical lens 41 and an fθ lens 42.

A process of optical scanning will now be described more specifically. The light flux emitted by the semiconductor laser 1, for example, is transformed into an approximately parallel light flux by the collimating lens 21, and passes through the aperture 22. It is also possible to use a coupling lens instead of the collimating lens 21, and to transform the light flux from the semiconductor laser 1 into a weakly divergent light flux or a weakly convergent light flux.

The light flux from the semiconductor laser 1 is transformed into the approximately parallel light flux, which is then converged into a line image elongated in the deflection direction by the cylindrical lens 23, and is directed to the deflection reflective surface of the polygon mirror 3. The light flux deflected by the polygon mirror 3 is incident on the scanning lens 41, and, the beam spot is formed on the surface 5 to be scanned. The characteristics of curvature of field and uniform-velocity characteristics of the scanning lens 41 are well corrected. Further, the light flux deflected by the polygon mirror 3 is first directed to a photodetection portion 6 by an optical-path changing mirror 8 via the scanning lens 41, and is used as a synchronization signal for detecting a position. from which an image is written.

Generally speaking, the intensity distribution of the light flux emitted from a laser light source is a Gaussian distribution. At this time, the depth of focus Z of the light flux which forms a beam spot having a diameter (o on a surface to be scanned is expressed by the following expression;

$$Z = k\omega^2/\lambda \quad (a)$$

In the above equation (a), k represents a constant, and $\lambda$ represents the wavelength.

As can be clearly seen from the above equation (a), as the diameter ω of the beam spot is reduced, the depth of focus Z decreases at the rate of the second power of the diameter ω of the beam spot.

The diameter ω of the beam spot is expressed by the following equation:

$$\omega = K\lambda/NA \quad (b)$$

In the above equation (b), K represents a constant, $\lambda$ represents the wavelength and NA represents the numerical aperture.

Recently, as the resolution of an image outputting apparatus which uses a laser as a light source such as a laser printer is increased and the quality of images obtained therefrom is increased, it is necessary to reduce the diameter of a beam spot on a surface to be scanned, that is, the surface of a photosensitive body in an example of a laser printer.

However, as shown in the equation (a), the depth of focus Z is determined to be in proportion to the second power of the diameter ω of a beam spot in the case of a Gaussian beam, reduction in the diameter ω of the beam spot results in decreases in the depth of focus Z, and, thereby, it is difficult to satisfy the allowable range for practical use.

In order to solve the problem, Japanese Laid-Open Patent Application No. 5-307151 discloses an optical scanning device in which a beam spot on a photosensitive body Is formed by a Bessel beam.

The Bessel beam is a non-diffracting beam by using which it is possible to reduce the diameter of a beam spot and to increase the depth of focus in comparison to the above-described Gaussian beam. The Bessel beam has the Intensity distribution approximately in proportion to the second power of the zero-order Bessel function of the first kind. With regard to the Bessel beam, see "Exact Solutions For Non-diffracting Beams', written by J. Durnin, Vol. 4, No. 4/April 1987/J. Opt. Soc. Am. A, page 651.

Methods of generating the Bessel beam include using a ring-shaped thin slit (see 'Diffraction-Free Beams', written by J. Durnin et al., Physical Review Letters, Vol. 58, No. 15, Apr. 13, 1987, page 1499), and using an axicon prism (see 'Long-Range Laser-Beam Spot Formation By An Axicon Prism', written by Satoshi Kawata et al., Proceedings of Spring Lecture of Applied Physics Society (1990), page 829) and others.

The above-mentioned Japanese Laid-Open Patent Application No. 5-307151 discloses an optical scanning device which performs image formation on a surface of a photosensitive body using a Bessel beam having an intensity distribution approximately in proportion to the second power of the zero-order Bessel function of the first kind obtained from a laser light.

However, because the Bessel beam develops large side lobes, the image quality is degraded.

In order to reduce the side lobes, Japanese Laid-Open Patent No. 6-148545 discloses an optical scanning device which generates an eccentric Bessel beam, and cuts off the side lobes using a slit member. In this optical scanning device, the slit member having a slit in a direction which coincides with the deflection direction is arranged in proximity to a surface to be scanned.

However, it is difficult to adjust the position of this slit member properly. Further, by using the slit, the quantity of light is greatly reduced. There is another method in which an axicon prism is used for reducing the side lobes. However, in this method using the axicon prism, it is necessary to mount the axicon prism with high accuracy, and. thereby, it is difficult to achieve mass production of optical scanning devices using the axicon prisms.

Japanese Laid-Open Patent Application No. 9-243945 discloses an optical scanning device in which stop means and shading means are provided between a collimating lens and a cylindrical lens. By using the simple means, the diameter of a beam spot is reduced, and the depth of focus is enlarged.

However, also in this method, a portion in the vicinity of the center of a light flux is cut off, and, thereby, the quantity of light is reduced.

Further, recently, consideration of environmental factors is required, and, recycling is being performed for OA equipment such as a copier. Accordingly, designing of structures and components which are suitable for recycling is becoming advanced, and, also, designing of components which can be used in common for various devices is being further developed.

SUMMARY OF THE INVENTION

To overcome the problems described above, preferred embodiments of the present invention provide an optical scanning device including an optical system which provides a large degree of depth of focus in order to obtain an excellent small-diameter beam spot even when component allowance (the curvature radiuses, thickness, refractive indexes) deviations of optical components of the optical system, mounting errors, environment variations (temperature, humidity), or other such problems occur.

Furthermore, preferred embodiments of the present invention provide an optical scanning device including an optical system through which the side lobes of the Bessel beam are minimized.

Another preferred embodiment of the present invention provides an optical scanning device which minimizes the diameter of a beam spot in a simple manner and without any adverse affects due to the side lobes and without causing reduction of the quantity of light.

Another preferred embodiment of the present invention provides an optical scanning device which is produced using components which can be used in common in various types of devices, and/or by recycling of a device in the related art.

In one specific preferred embodiment of the present invention, an optical scanning device includes a coupling lens which couples a light flux from a light source to form a parallel light flux, a convergent light flux or a divergent light flux, an optical deflector including a deflective reflection surface which deflects the light flux from the coupling lens at a uniform angular velocity, a scanning image-formation optical system which converges the deflected light flux from the optical deflector on a surface to be scanned to form a beam spot, wherein the device scans the surface to be scanned with the beam spot at a uniform velocity and the device further includes a depth increasing component, for increasing the depth of focus determined by the entire optical system of the device, on the optical path between the light source and the deflective reflection surface.

As a result of this novel combination of structural elements, it is possible to provide an optical scanning device which achieves a large allowable degree of depth of focus determined by the entire optical system of the device.

Accordingly, it is possible for the optical scanning device providing a large allowable degree of depth of focus to produce excellent small-diameter beam spots even when component allowance (the curvature radiuses, thickness, deviations of optical elements of mounting errors, and environment refractive Indexes) the optical system, variations (temperature, humidity) occur.

The depth increasing component may preferably include an intensity-distribution transforming component which transforms the intensity distribution of the light flux such that the intensity distribution on the exit pupil is changed so that the intensity at four corners thereof is higher than that at a central portion.

As a result of this unique structure, the optical scanning device achieves a large allowable degree of depth of focus determined by the entire optical system of the device.

The depth increasing component may also include a phase-distribution transforming component which transforms the phase distribution of the light flux such that the phase distribution on the exit pupil is arbitrarily changed.

As a result, the optical scanning device achieves a large allowable degree of depth of focus determined by the entire optical system of the device.

The depth increasing component may also include an intensity-distribution transforming component which transforms the intensity distribution of the light flux so that the intensity distribution on the exit pupil is changed, and a phase-distribution transforming component which transforms the phase distribution of the light flux such that the phase distribution on the exit pupil is changed.

As a result, the optical scanning device achieves a large allowable degree of depth of focus determined by the entire optical system of the device, and small side lobes.

The depth increasing component may also include an optical component obtained as a result of integrating an intensity-distribution transforming component which transforms the intensity distribution of the light flux such that the intensity distribution on the exit pupil is changed, and a phase-distribution transforming component which transforms the phase distribution of the light flux such that the phase distribution on the exit pupil is changed.

Thereby, the optical scanning device achieves a large allowable degree of depth of focus determined by the entire optical system of the device, and small side lobes, in a very compact configuration.

In another preferred embodiment of the present invention, an optical scanning device includes a light source which emits a light flux, an optical deflector which deflects the light flux, a first optical system which directs the light flux emitted from the light source to the optical deflector, and a second optical system which directs the light flux deflected by the optical deflector onto a surface to be scanned, wherein the first optical system includes an intensity-distribution transforming unit which has at least one intensity-distribution transforming lens and transforms the intensity distribution of the light flux emitted from the light source into an arbitrary intensity distribution.

As a result of this unique structure and arrangement thereof, the optical scanning device simply and reliably produces beam spots having a very small diameter, increases the depth of focus determined by the entire optical system of the device, and, at the same time, decreases the side lobes of the beam spot, without decreasing the quantity of light. Further, it is possible to use components of optical scanning devices in common and to recycle the optical scanning devices.

The first optical system may further include an optical coupling component which couples the light flux emitted from the light source and an optical converging component which converges, at least in the direction perpendicular to the deflection direction, the light flux in proximity to the optical deflector.

As a result of this structure which is relatively simple, i.e., the two optical components and the intensity-distribution transforming unit, the optical scanning device produces beam spots with minimal diameter, increases the depth of focus determined by the entire optical system of the device, and, at the same time, decreases the side lobes of the beams spot, without decreasing the quantity of light. Further, it is possible to use components of optical scanning devices in common and to recycle the optical scanning devices.

The first optical system may further include a collimating lens which transforms the light flux emitted from the light source into an approximately parallel light flux, and a cylindrical lens which has power in the sub-scanning direction and the intensity-distribution transforming unit may transform the intensity distribution of the light flux and emits the resulting light flux in a form of an approximately parallel light flux.

As a result, through a simple structure, i.e., the general-purpose collimating lens and cylindrical lens, and the intensity-distribution transforming unit, the designing of which for transforming an approximately parallel light flux into an approximately parallel light flux is relatively easy, the optical scanning device produces beam spots having a much smaller diameter, increases the depth of focus determined by the entire optical system of the device, and, at the same time, decreases the side lobes of the beam spot, without decreasing in the quantity of light. Further, it is possible to use components of optical scanning devices in common and to recycle the optical scanning devices.

The at least one intensity-distribution transforming lens may also include an axially symmetric aspherical lens.

Thereby, it is possible to miniaturize the device, and, because working of the axially symmetric aspherical lens is relatively easy, it is possible to reduce the cost of the device.

The intensity-distribution transforming unit may also include an axially symmetric aspherical lens in a form of a single lens.

Thereby, it is possible to miniaturize the device, and, because working the axially symmetric aspherical lens in a form of a single lens is relatively easy, it is possible to reduce the cost of the device.

The at least one intensity-distribution transforming lens may include a special toric lens.

Thereby, it is possible to change the intensity distribution of the light flux arbitrarily, and it is possible to increase the degree of freedom in the intensity-distribution transformation.

The intensity-distribution transforming unit may include a special toric lens in a form of a single lens.

Thereby, it is possible to change the intensity distribution of the light flux arbitrarily, and it is possible to increase the degree of freedom in the intensity-distribution transformation.

The light source may include a semiconductor laser which emits a light flux having an approximately Gaussian distribution and the light flux directed onto the surface to be scanned may have an intensity distribution which is a non-Gaussian distribution.

Thereby, it is possible to provide a less-expensive, small-sized optical scanning device.

The diameter of the beam spot of the light flux directed onto the surface to be scanned may be smaller than the diameter of the beam spot obtained when the intensity distribution of the light flux is not changed.

Thereby, through a simple arrangement, it is possible to obtain the high-resolution optical scanning device. Further, it is possible to obtain a small beam spot easily by combining the intensity-distribution transforming unit into the optical scanning device in the related art.

The intensity of the highest side lobe of the light flux directed onto the surface to be scanned may be smaller than $1/e^2$ of the peak intensity of the light flux.

Thereby, as a result of increasing the depth of focus determined by the entire optical system of the device and also reducing the intensity of the side lobes of the light flux through a very simple structure, the optical scanning device forms very high-quality images. Further, by combining the intensity-distribution transforming unit into the optical scanning device in the related art, it is possible to increase the depth of focus determined by the entire optical system of the device, and, also, at the same time, reduce the intensity of the side lobes of the light flux easily.

Further, by using any of the above-described optical scanning devices as an exposing unit of an image forming apparatus, it is possible to minimize the diameter of the beam spot, and, by increasing the depth of focus determined by the entire optical system of the device, and, also, at the same time, reducing the intensity of the side lobes of the light flux, it is possible to obtain high-resolution, high-quality images.

Other advantages, features, characteristics and elements of the present invention will become more apparent from the following detailed description of preferred embodiments when read in conjunction with the accompanying drawings.

BRIEF DESCRIPTION OF THE DRAWINGS

FIG. 5 shows a plan view of a density filter which can also be used as the intensity-distribution transforming component in the first preferred embodiment of the present invention;

FIG. 12A shows an optical arrangement of an intensity-distribution transforming optical system which can be used in the fifth preferred embodiment of the present invention;

FIG. 12B Is a graph showing the intensity distribution of a light flux incident on the intensity-distribution transforming optical system shown in FIG. 12A;

FIG. 12C is a graph showing the intensity distribution of the light flux emitting from the intensity-distribution transforming optical system shown in FIG. 12A;

FIG. 17A shows an optical arrangement of another example of the first optical system which can be used in the fifth preferred embodiment of the present Invention;

FIG. 17B shows the intensity distribution of the light flux emitted from a light source in the arrangement shown in FIG. 17A;

FIG. 17C shows the intensity distribution of the light flux incident on a deflective reflection surface of a deflecting unit in the arrangement shown In FIG. 17A;

FIG. 17D shows the intensity distribution of the light flux emitted from the light source in the arrangement shown in FIG. 17A;

FIGS. 17E and 17F show the intensity distributions of the light flux incident on the deflective reflection surface of the optical deflecting unit in the arrangement shown in FIG. 17A;

DETAILED DESCRIPTION OF PREFERRED EMBODIMENTS

The structure, elements, arrangements, operations and functions of preferred embodiments of the present invention will now be described with reference to figures.

Figure 3:
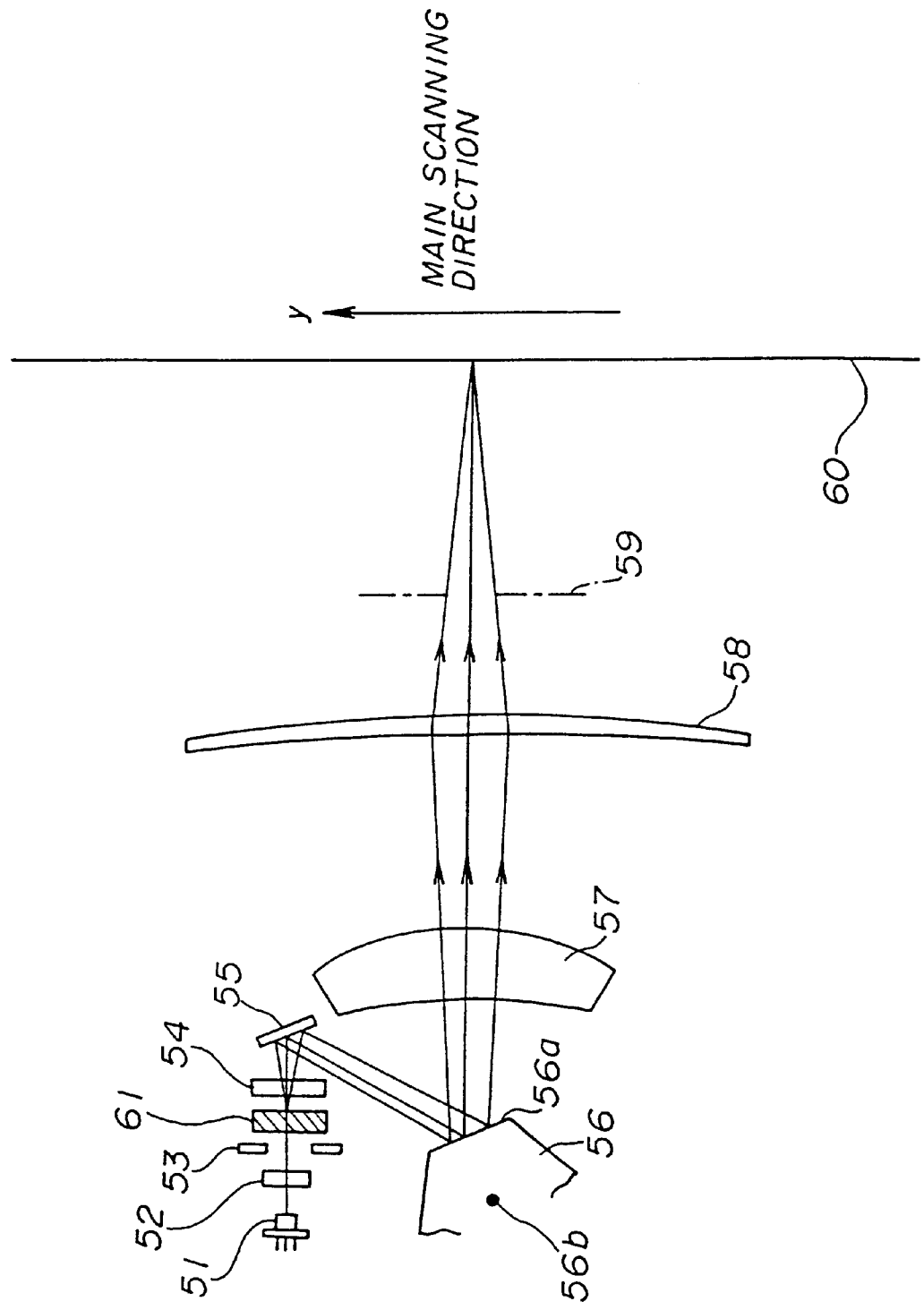
FIG. 3 shows a general arrangement of an optical scanning device in each of first, second, third and fourth preferred embodiments of the present invention.

FIG. 3 shows a general arrangement of an optical scanning device in each of first, second, third and fourth preferred embodiments of the present invention. FIG. 3 shows the sectional view of the arrangement of the optical scanning device taken along a main-scanning plane (the plane including the optical axis and in parallel to the main scanning direction).

In FIG. 3, a radiant light flux from a semiconductor 51 which defines a light source is coupled to a subsequent optical system by a coupling lens 52 so as to form a parallel light flux, weakly convergent light flux or weakly divergent light flux. The thus-coupled light flux passes through an aperture 53, a peripheral portion of the light flux is cut off by the aperture 53, and, thus, beam shaping is performed. Then, the resulting light flux is caused to converge in the sub-scanning direction (the direction perpendicular to the sheet surface of FIG. 3) by a cylindrical lens 54 defining a line-image-formation optical system and the optical path thereof is bent by a mirror 55. Then, the resulting light flux forms a line image which is elongated in the main scanning direction in proximity to a deflective reflection surface 56a of a polygon mirror 56 defining an optical deflector. The light flux reflected by the deflective reflection surface 56a is deflected at a uniform angular velocity as the polygon mirror 56 rotates, and is transmitted by lenses 57 and 58. The two lenses 57 and 58 defining a scanning image-formation optical system, converge the deflected light flux to form a beam spot on a surface to be scanned 60 (for example, the surface of a photoconductive photosensitive body). As a result, the deflected light flux scans the surface to be scanned 60 at a uniform velocity in the main scanning direction. As the scanning image-formation optical system, it is preferable to use an optical system, which accurately corrects the uniform-velocity characteristics such as the curvature of field, fθ characteristics, for example, the scanning image-formation lenses disclosed by Japanese Patent Application No. 10-322116 filed by the applicant of the present application.

In the above-described optical scanning device, in order to achieve an optical system which provides a large allowable degree of depth of focus in order to obtain an excellent small-diameter beam spot even when component allowance (the curvature radiuses, thickness, refractive indexes) deviations of optical components of the optical system, mounting errors, environment variations (temperature, humidity), or other such problems occur, a depth increasing component 61 for increasing the depth of focus provided by the optical system is added in the optical path between the semiconductor laser 51 defining the light source and the deflective reflection surface 56a.

The depth increasing component 61 may have various elements and configurations. For example, an intensity-distribution transforming component defining the depth increasing component 61, which transforms the intensity distribution of the light flux so as to change the intensity distribution on the exit pupil 59 into an intensity distribution in which the intensity at peripheral four corners is higher than the intensity at a central portion, may be provided in the optical path between the semiconductor laser 51 and the deflective reflection surface 56a.

Alternatively, a phase-distribution transforming component, which transforms the intensity distribution of the light flux so as to change the phase distribution on the exit pupil 59 arbitrarily, is provided in the optical path between the semiconductor laser 51 and the deflective reflection surface 56a. Alternatively, as the depth increasing component 61, a phase-distribution transforming component, which transforms the phase distribution of the light flux so as to change the phase distribution on the exit pupil 59, and an intensity-distribution transforming component, which transforms the intensity distribution of the light flux so as to change the intensity distribution on the exit pupil 59, are provided in the optical path between the semiconductor laser 51 and the deflective reflection surface 56a. Alternatively, as the depth increasing component 61, an optical component including an integral unit of the phase-distribution transforming component and the intensity-distribution transforming component, is provided along the optical path between the semiconductor laser 51 and the deflective reflection surface 56a.

The first preferred embodiment of the present invention will now be described.

In the related art, changing the amplitude distribution on the exit pupil is performed by a component which changes the intensity distribution one-dimensionally, such as that using an axicon prism, or an axially symmetric component such as a conical prism or a density filter (in which the transmittance at the periphery is increased with respect to that at the center).

The inventors of the present application discovered that, especially in a case where such a component is used in an optical system of an optical scanning device, the intensity distribution along a line passing through the optical axis and parallel to the main scanning direction and a line passing the optical axis and parallel to the sub-scanning direction hardly contributes to the increase in the depth of focus, but the intensity distribution along lines passing through the optical axis and parallel to the diagonal directions contribute to an increase in the depth of focus. Further, in the related art, because the axially symmetric component is used, it is difficult to set the beam spot independently in each of the main scanning direction and sub-scanning direction.

Figure 8A:
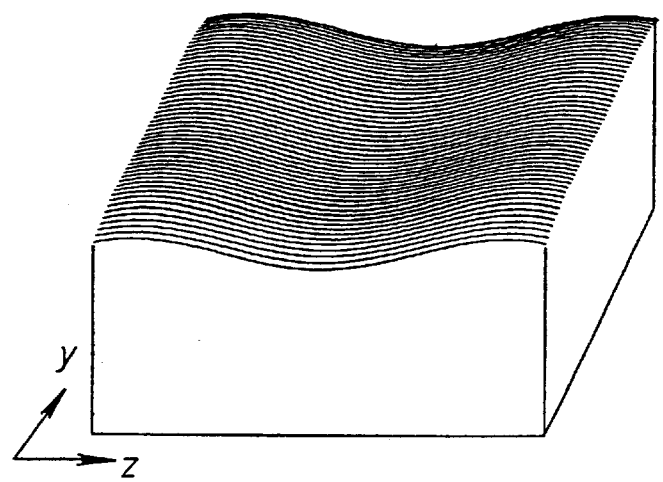
FIGS. 8A, 8B and 8C show the intensity distribution on the exit pupil and the intensity distribution of the beam spot on the image surface of an optical system using one example of the depth increasing component according to preferred embodiments of the present invention.
Figure 8B:
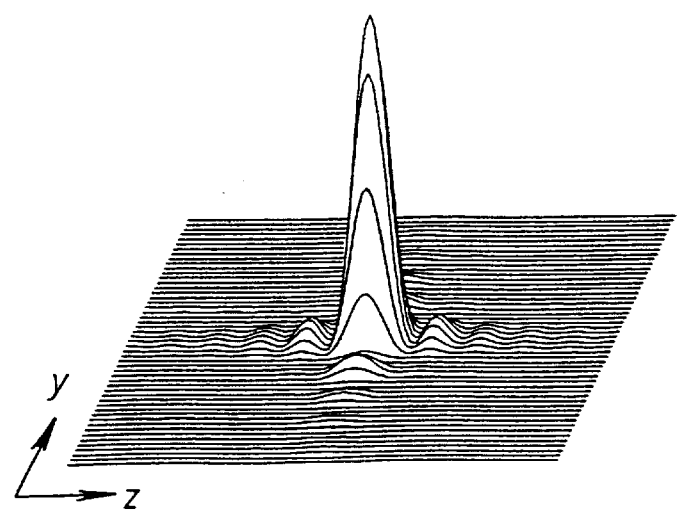
Figure 8C:
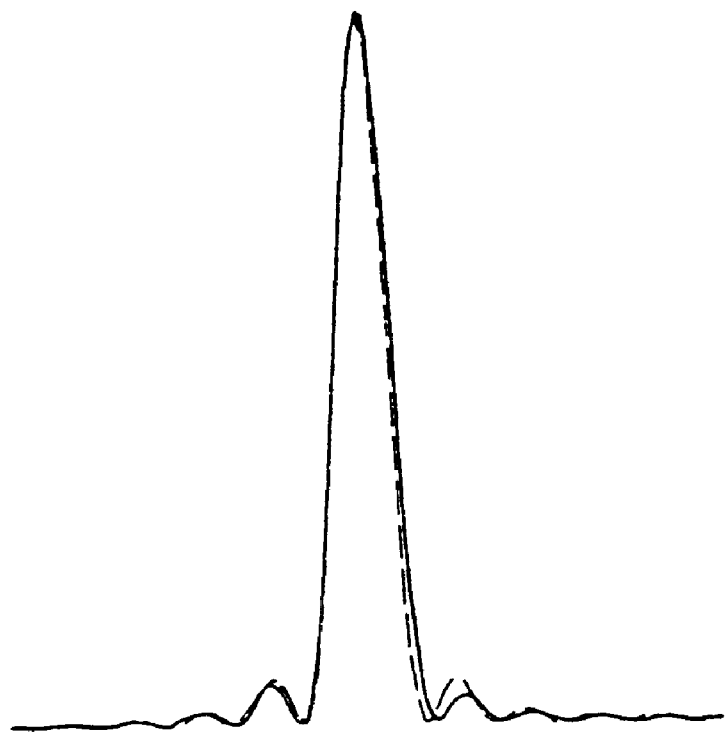
Figure 9A:
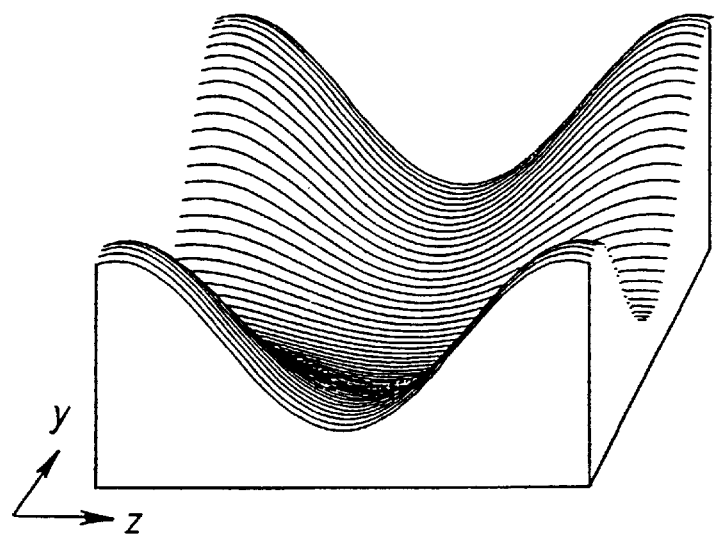
FIGS. 9A, 9B and 9C show the intensity distribution on the exit pupil and the intensity distribution of the beam spot on the image surface of an optical system using another example of the depth increasing component according to preferred embodiments the present invention.
Figure 9B:
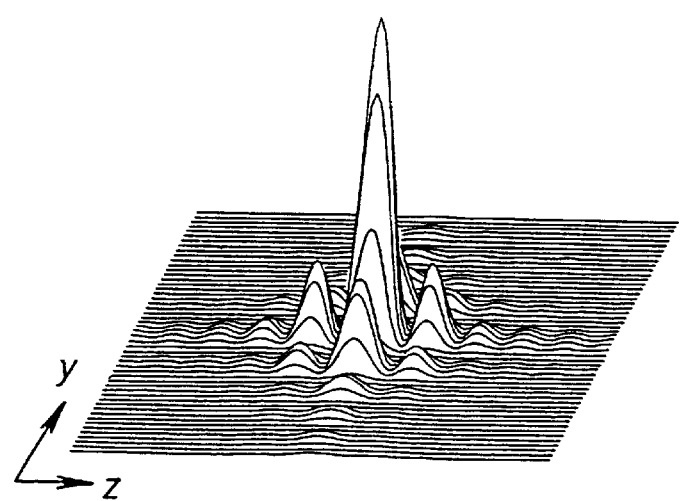
Figure 9C:
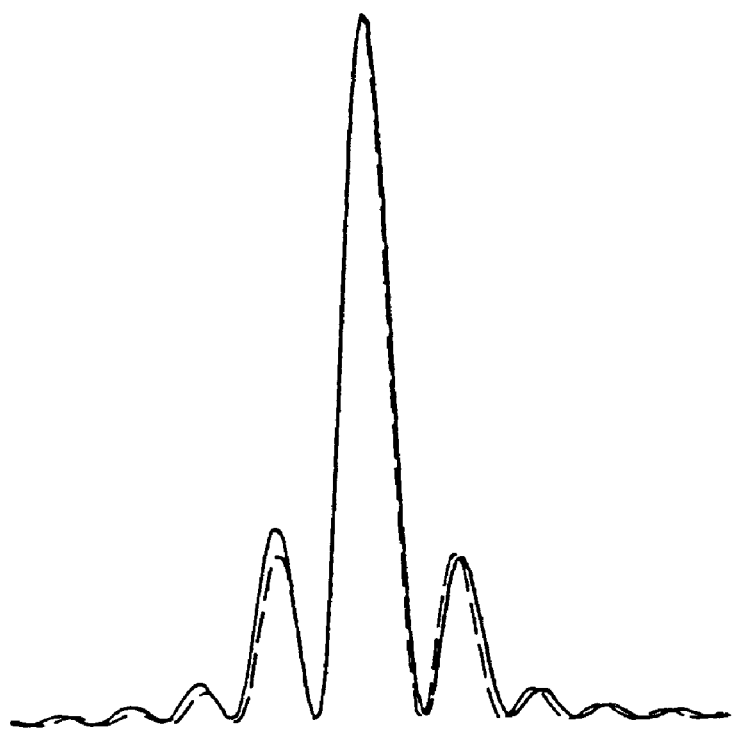

Accordingly, in the first preferred embodiment, as the depth increasing component 61, an intensity-distribution transforming component, which transforms the intensity distribution of the light flux so as to change the intensity distribution on the exit pupil 59 into an intensity distribution in which the intensity at peripheral four corners is higher than the intensity at a central portion, is provided in the optical path between the semiconductor laser 51 and the deflective reflection surface 56a. Thus, as shown in FIGS. 8A, 8B, 8C, 9A, 9B and 9C, as a result of setting the intensity in the oblique directions (diagonal directions) with respect to the main scanning direction (y-direction in the figures) and sub-scanning direction (z-direction In the figures) to be higher than the intensity at the center, it is possible to obtain the beam spot having a large depth of focus on the image surface. FIGS. 8A, 8B and 8C show an example, and FIGS. 9A, 9B and 9C show another example, in which the rate of increase in the depth of focus is different from that in the example of FIGS. 8A, 8B and 8C. Each of FIGS. 8A and 9A shows the intensity distribution on the exit pupil three-dimensionally. Each of FIGS. 8B and 9B shows the intensity distribution on the image surface (surface to be scanned) three-dimensionally. Each of FIGS. 8C and 9C shows LSF (Line Spread Function) on the image surface (surface to be scanned) in the main scanning direction (the solid line in the figure) and in the sub-scanning direction (the broken line in the figure).

In the first preferred embodiment, it is possible to efficiently cause the optical energy to contribute to the increase in the depth of focus by increasing the intensity in the diagonal directions. Further, because the depth increasing component 61 is not axially symmetric, it is possible to set the shape and diameter of the beam spot independently in each of the main scanning direction and sub-scanning direction.

Figure 4A:
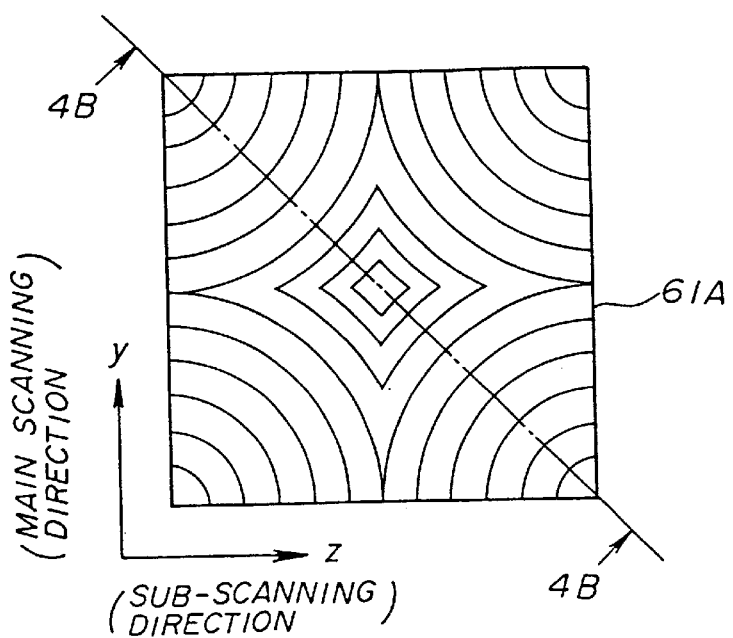
FIGS. 4A and 4B Illustrate a structure of a diffraction image-formation optical component which can be used as an intensity-distribution transforming component in the first preferred embodiment of the present invention.
Figure 4B:
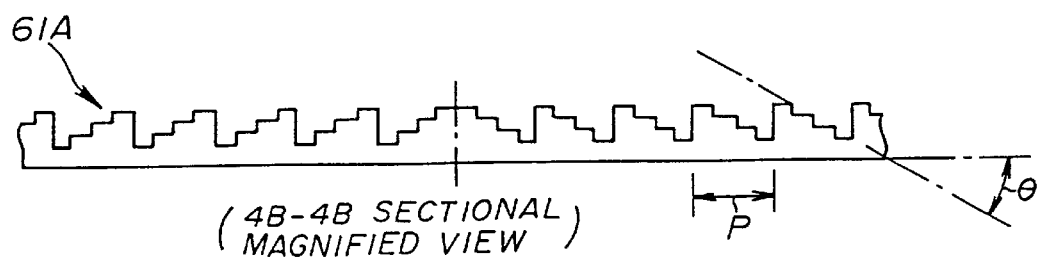

As a specific example of the intensity-distribution transforming component, it is possible to use a diffraction image-formation optical component (Fresnel lens) 61A having a stair-shaped binary-type grating structure, such as that shown in FIGS. 4A and 4B. By appropriately adjusting the grating pitch P and/or inclination angle θ, it is possible to obtain a desired intensity distribution.

Alternatively, it is also possible to use, as the intensity-distribution transforming component, a density filter 61B, such as that shown in FIG. 5, in which the transmittance is increased only in the diagonal directions. It is possible to obtain a desired intensity distribution by appropriately adjusting the density and/or area of the hatched portion other than the portions in the diagonal directions.

Figure 6A:
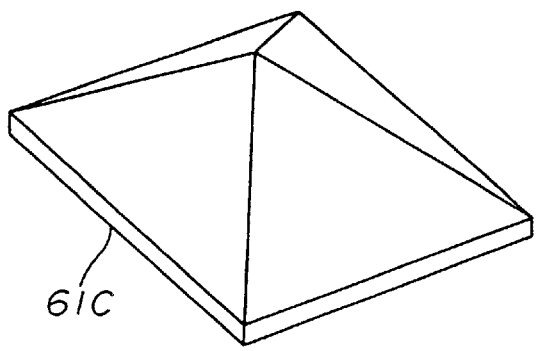
FIGS. 6A and 6B illustrate a structure of a quadrangular-pyramid prism which can also be used as the intensity-distribution transforming component in the first preferred embodiment of the present invention.
Figure 6B:
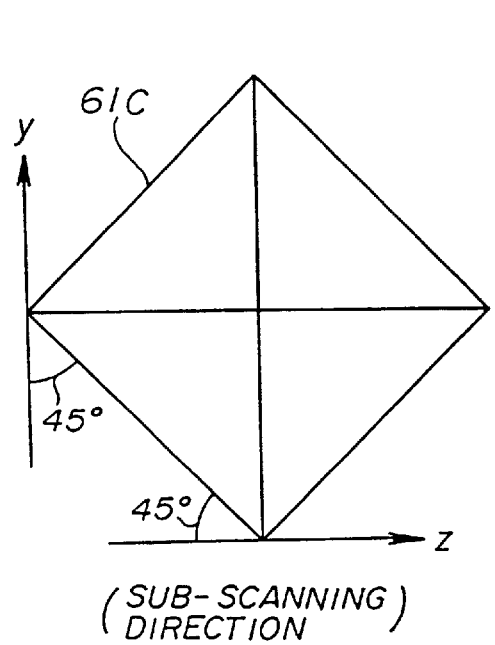

Another alternative is to use, as the intensity-distribution transforming component, a quadrangular-pyramid prism 61C, such as that shown in FIG. 6A, in manner in which the prism 61C is inclined by about 45° with respect to the main scanning direction and also with respect to the sub-scanning direction as shown in FIG. 6B. It is possible to obtain a desired intensity distribution by appropriately adjusting the angle of the inclined surfaces.

By using any of these intensity-distribution transforming components, it is possible to obtain an intensity distribution, as shown in FIG. 8A or 9A, in which the intensity is increased in the diagonal directions, and to achieve an optical system providing an increased allowable degree of depth of focus. However, when the intensity is increased in the diagonal directions too much, large side lobes may develop. Therefore, it is preferable to set the intensity distribution on the exit pupil to one between that shown in FIG. 8A and that shown in FIG. 9A.

The second preferred embodiment of the present invention will now be described.

A system in the related art generates a Bessel beam by transforming the intensity distribution of the light flux so as to change the intensity distribution (distribution obtained from squaring the amplitude distribution) on the exit pupil into an arbitrary distribution through an optical component such as an conical prism, a density filter or other such device, in order to increase the allowable degree of depth of focus.

However, when the density filter is used, the loss in quantity of light is large, and, as a result, achievement of high-speed processing is prevented when the density filter is used in an optical system in an optical scanning device. When the conical prism is used, because working thereof is difficult, the cost may increase. Further, in these methods, because refraction is used for obtaining an arbitrary intensity distribution on the pupil, the setting positions of the optical components are limited.

On the other hand, development of a phase distribution can be easily achieved by using an ordinary phase shifter in which unevenness is engraved on a plate (the phase shifter may be of either a stair-shaped binary type (through which the optical path length varies with respect to position thereof discretely among more than two values) or a 0/1-two-value binary type (through which the optical path length varies with respect to position thereof discretely only between two values)). Further, it is possible to manufacture a large quantity of phase shifters through plastic molding at a low cost. Also, because a phase shifter does not have refracting power, the phase shifter can be located any place along the optical path in principle.

In the second preferred embodiment, the depth increasing component 61 preferably includes a phase transforming component, such as the above-mentioned phase shifter, and transforms the phase distribution of the light flux so as to change the phase distribution on the exit pupil into an arbitrary distribution, and thereby, similar to the case of transformation of the intensity distribution, it is possible to form a beam spot having a large depth of focus. Here, by inverse-Fourier-transforming the amplitude distribution (becoming the intensity distribution as a result of being squared) of a beam spot (for example, a Bessel-beam spot) having a large depth of focus on the image surface (surface to be scanned), the phase distribution on the exit pupil can be calculated.

More specifically, a phase distribution is obtained using a method such as the algorithm of Gerchberg-Saxton (see "A Practical Algorithm for the Determination of Phase from Image and Diffraction Plane Pictures", written by R. W. Gerchberg and W. O. Saxton. OPTIK, Vol. 35 (No. 2), pages 237–246 (1972)) or other methods. Then, the thus-obtained phase distribution is quantized so as to obtain a phase distribution having two phase values or more than two phase values. Thereby, data needed for producing a binary-type phase shifter is obtained (the binary-type phase shifter may be of either a stair-shaped binary type (through which the optical path length varies with respect to position thereof discretely among more than two values) or a 0/1-two-value binary type (through which the optical path length varies with respect to position thereof discretely only between two values)). Because a phase distribution obtained in such a way is complex, a specific example of numerical values will be omitted.

A third preferred embodiment of the present invention will now be described.

In the related art, a Bessel beam is generated in order to increase the allowable degree of depth of focus. A method of increasing the Bessel beam using a conical prism or a binary lens having an optical performance equivalent to that of the conical prism is proposed. However, in the above-mentioned method, side lobes of a beam spot develop.

Figure 10A:
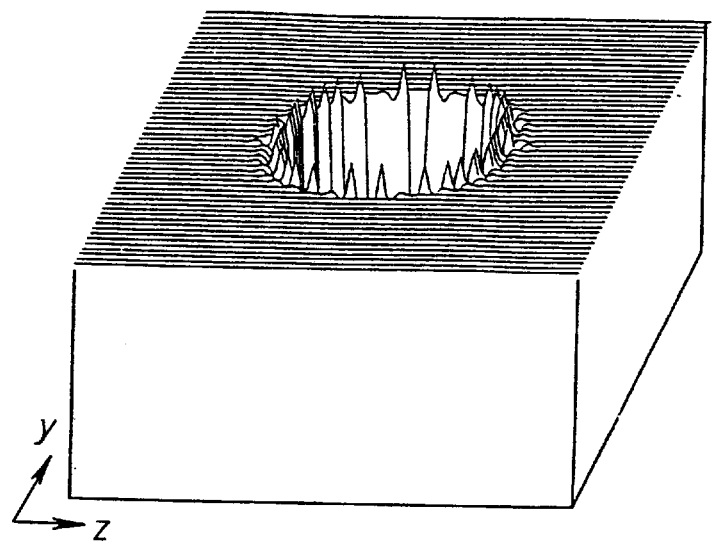
FIGS. 10A, 10B and 10C show the intensity distribution on the exit pupil and the intensity distribution of the beam spot on the image surface of an optical system using an optical component such as a conical prism in the related art.
Figure 10B:
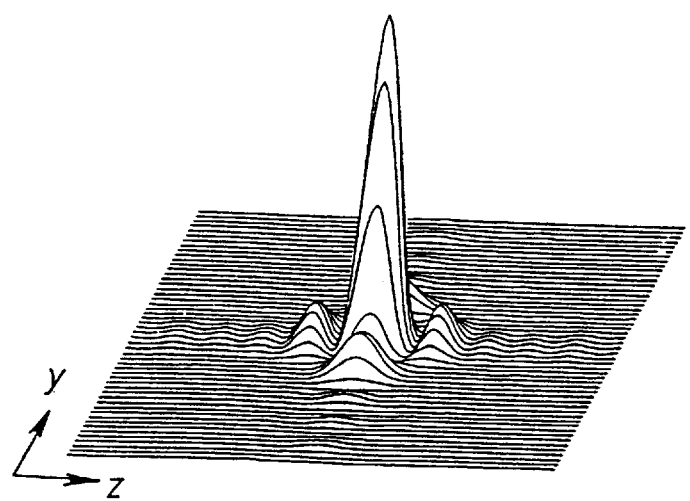
Figure 10C:
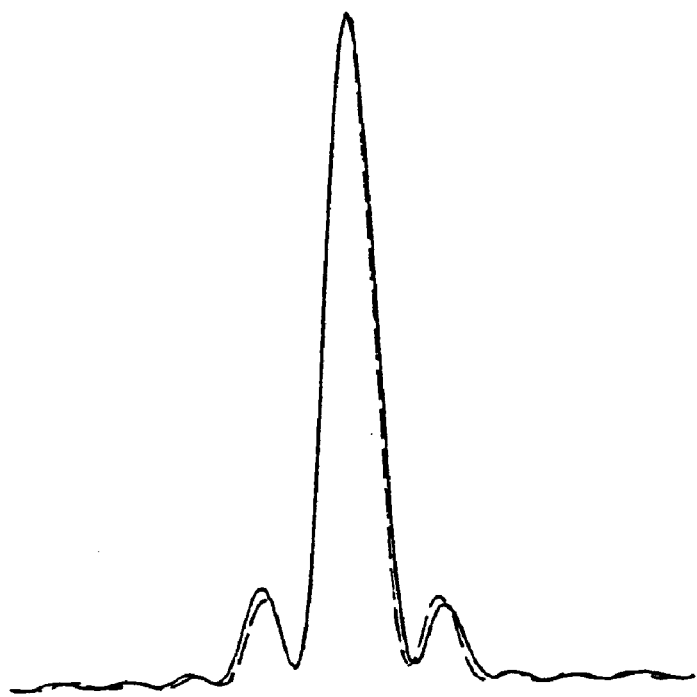

In this method, a Bessel beam is obtained as a result of only the amplitude distribution $u_1(y_1, z_1)$ in the following equation (2) being transformed into an arbitrary amplitude distribution using the intensity-distribution transforming component. However, although the depth of focus of the resulting beam spot is generally increased, large side lobes develop. As the related art, FIG. 10A shows the intensity distribution on the exit pupil in a case where the intensity at the periphery is increased cylindrically with respect to the intensity at the center. As shown in FIGS. 10B and 10C, large side lobes develop, and it is difficult to form a small-diameter dot when the sensitivity of a photosensitive body which is a surface to be scanned is high.

$$u_2(y_2, z_2) = \frac{je^{-ik\left(x+\frac{y_2^2+z_2^2}{2x}\right)}}{\lambda x} \int\int u_1(y_1, z_1) e^{-i\frac{k}{2x}(y_1 y_2 + z_1 z_2)} dy_1 dz_1 \quad (2)$$

The above equation (2) is expressed assuming that the intensity distribution $u_2(y_2, z_2)$ of the beam spot on the image surface is approximately in accordance with the Fraunhofer diffraction.

In the above equation (2), $u_2(y_2, z_2)$: amplitude distribution of the beam spot on the image surface;

$u_1(y_1, z_1)$: amplitude distribution of on the pupil;

$-ik(y_1 y_2 + z_1 z_2)/2x$: phase difference on the pupil (k represents the wave number); and $j/\lambda$: Fresnel inclination coefficient (where $\lambda$ represents the used wavelength).

Here, one of the inventors of the present invention and so forth studied giving attention to the phase term "$-ik(y_1 y_2 + z_1 z_2)/2x$" of the above equation (2). As a result, it was discovered out that it is possible to obtain a good beam spot by giving phase two-dimensionally (changing the phase distribution on a plane perpendicular to the optical axis) using a phase-distribution transforming component in order to reduce the side lobes of the beam spot on the Image surface (surface to be scanned).

An appropriate phase distribution "$-ik(y_1 y_2 + z_1 z_2)/2x$" for reducing the side lobes can be obtained as follows.

Assuming that the amplitude distribution $u_1(y_1, z_1)$ on the pupil is arbitrary, the amplitude distribution $u_2(y_2, z_2)$ of the beam spot on the image surface is determined to be such that the side lobes are reduced, and inverse Fourier transform is performed on the amplitude distribution $u_2(y_2, z_2)$ of the beam spot on the image surface so as to obtain the appropriate phase distribution "$-ik(y_1y_2+z_1z_2)/2\times$" by which the side lobes are reduced.

Thus, it is possible to obtain a beam spot having decreased side lobes as a result of producing the binary-type phase shifter or the like, which is used as the phase-distribution transforming component. However, the thus-produced phase shifter generally has a complex pattern, and illustration thereof will be omitted.

The fourth preferred embodiment of the present invention will now be described.

By either combining or integrating the phase shifter in the third preferred embodiment and the intensity-distribution transforming component in the first preferred embodiment, it is possible to achieve an optical system, by which the allowable degree of depth of focus is increased and the side lobes of the beam spot are reduced, at a low cost.

Figure 7:
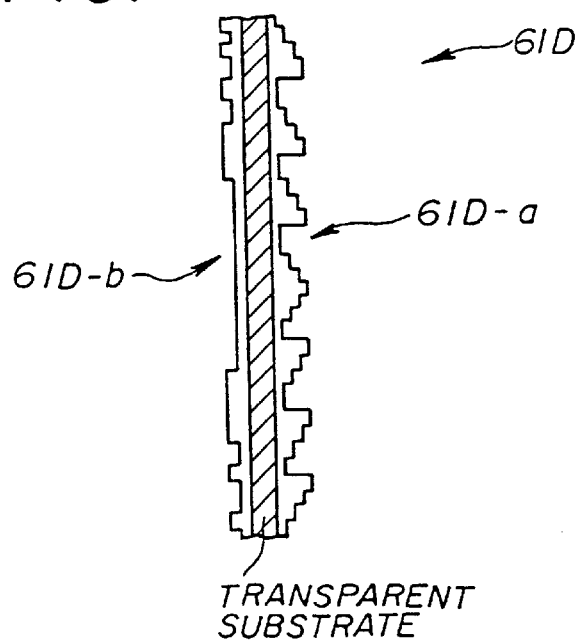
FIG. 7 shows a partial side-elevational sectional view of an example of a depth increasing component used in the fourth preferred embodiment of the present invention.

FIG. 7 shows a partial sectional view of an example of such a depth increasing component. This depth increasing component 61D is an optical component in which the phase-distribution transforming component and the intensity-distribution transforming component are integrated. One side of this optical component is an intensity-distribution transforming surface 61D-a, and the other side is a phase-distribution transforming surface (for example, a phase shifting surface) 61D-b. By adding the depth increasing component 61D having the above-mentioned structure on the optical path between the light source 51 and the deflective reflection surface 56a, it is possible to obtain a beam spot having a large depth of focus and reduced side lobes. In the example shown in FIG. 7, the intensity-distribution transforming surface 61D-a is formed of a Fresnel lens and is of the stair-shaped binary type and the phase-distribution transforming surface 61D-b is of the 0/1-two-value binary type.

Figure 1:
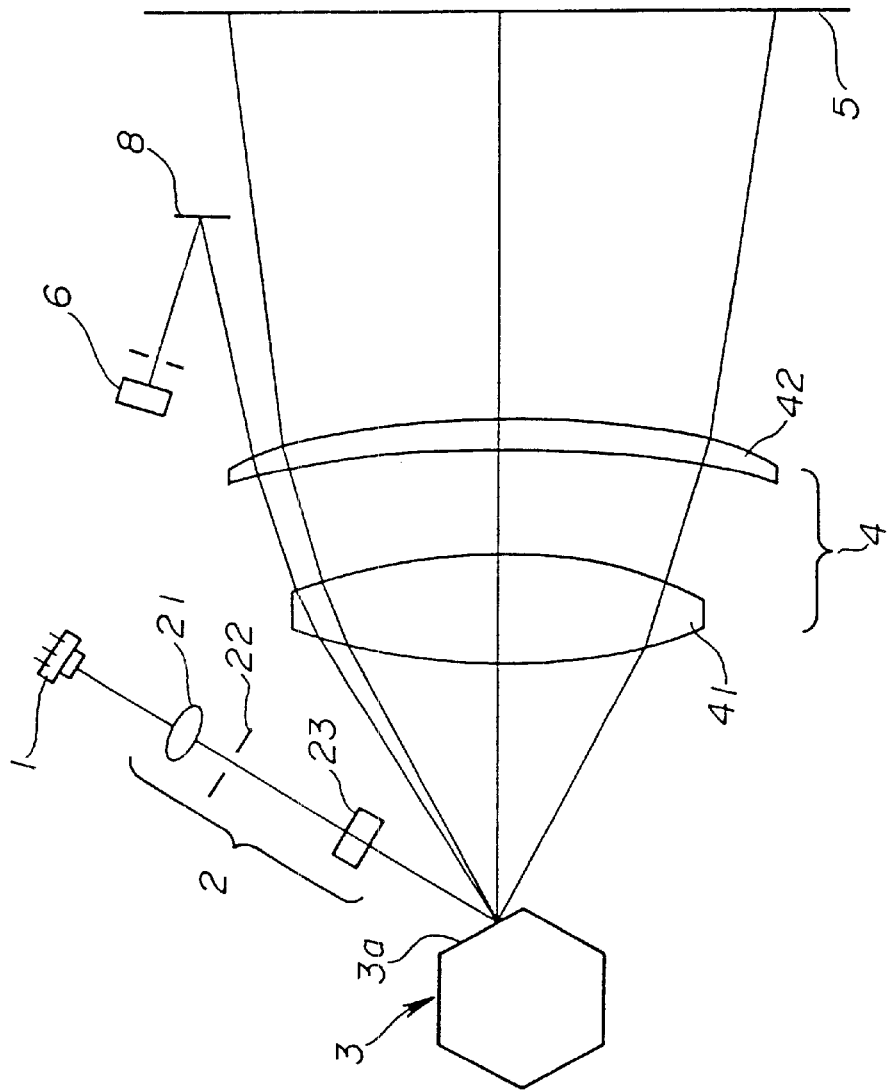
FIGS. 1, 2A and 2B show one example of an optical scanning device in the related art.
Figure 2A:
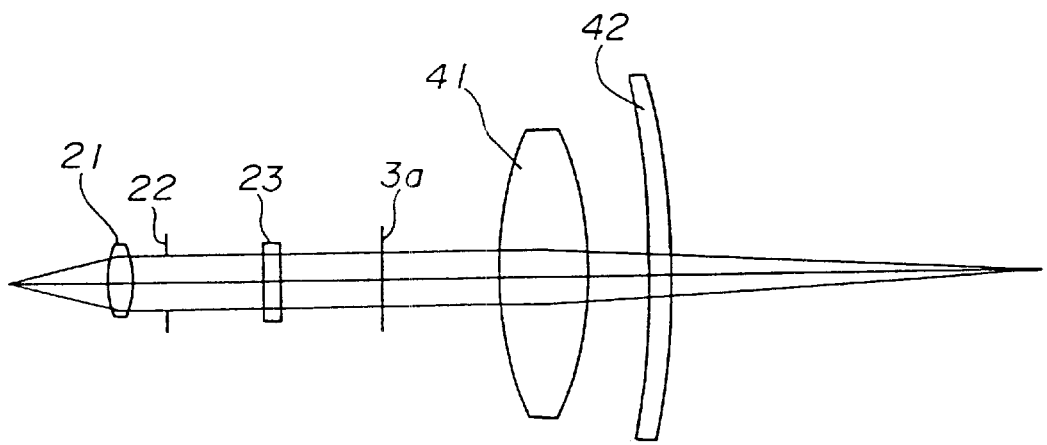
Figure 2B:
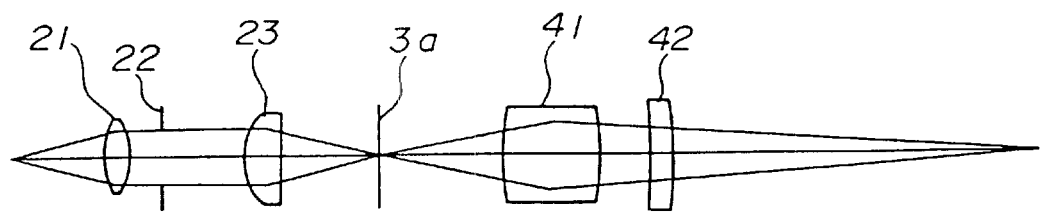

An optical scanning device according to a fifth preferred embodiment of the present invention will now be described. Similar components shown in FIGS. 1, 2A and 2B are designated with the same reference numerals.

Figure 11:
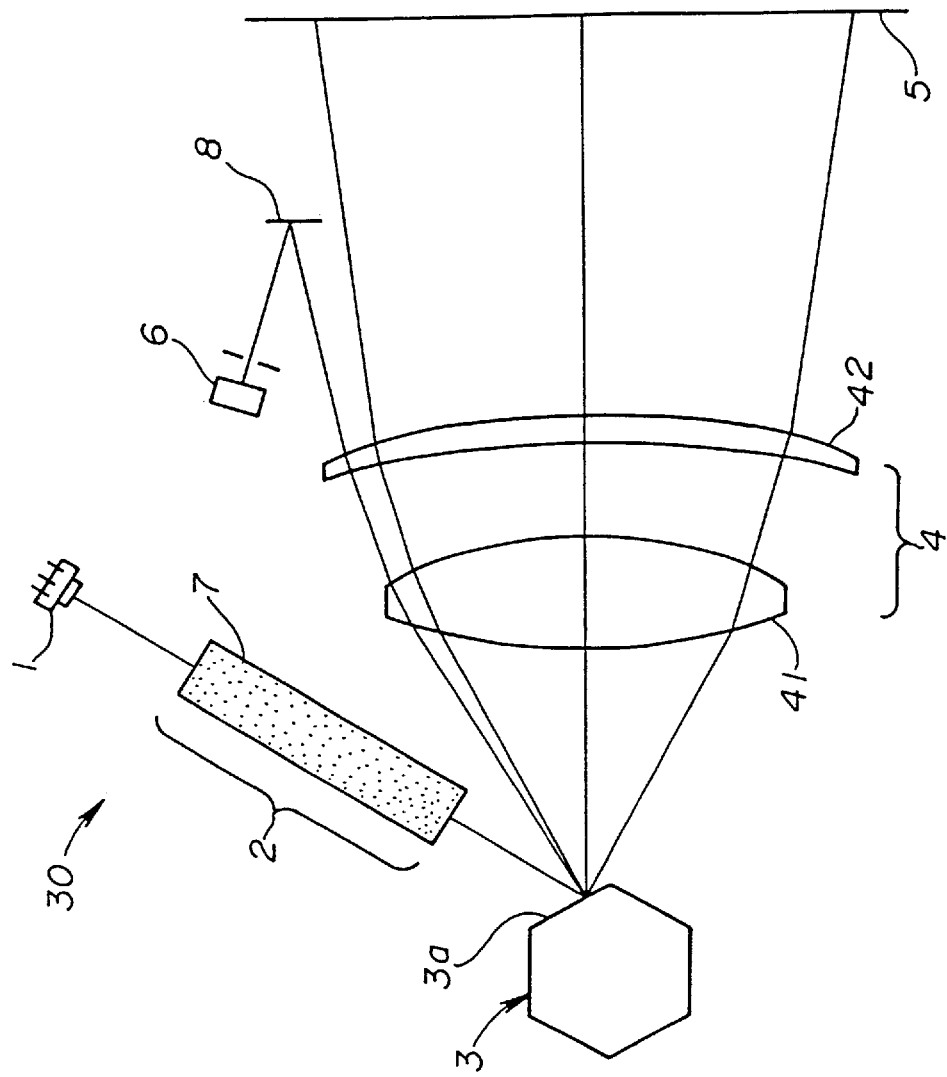
FIG. 11 shows an optical arrangement of an optical scanning device in a fifth preferred embodiment of the present invention.

FIG. 11 shows the optical scanning device according to the fifth preferred embodiment of the present invention. The optical scanning device 30 includes a light source 1 which emits laser light (light flux), a first optical system 2 having an intensity-distribution transforming unit 7 (including one or a plurality of intensity-distribution components) for transforming the intensity distribution of the laser light emitted by the light source 1 into an arbitrary intensity distribution, an optical deflecting unit 3 which deflects the light flux, which had the intensity distribution thereof transformed by the intensity-distribution transforming unit 7, and a second optical system 4 for forming a beam spot on a surface to be scanned 5 using the thus-deflected light flux.

The light flux emitted from the light source 1 is directed to the optical deflecting unit 3 via the first optical system 2. The first optical system 2 includes the intensity-distribution transforming unit 7 for transforming the intensity distribution of the light flux emitted by the light source 1 into the arbitrary intensity distribution. The light flux deflected by the optical deflecting unit 3 is directed to the surface to be scanned 5 through the second optical system 4, and forms the beam spot on the surface to be scanned 5. The optical system provided after the optical deflecting unit 3 and before the surface to be scanned 5, that is, the second optical system 4 is not limited to the arrangement including a spherical lens 41 and an fθ lens 42 shown in the figure, but well-known components can be widely applied thereto.

In the fifth preferred embodiment of the present invention, the intensity distribution of the light flux emitted from the light source 1 is transformed into the certain arbitrary intensity distribution by the intensity-distribution transforming unit 7 so that the beam spot having the desired intensity distribution is formed on the surface to be scanned 5. The desired intensity distribution on the surface to be scanned 5 may be, for example, the above-described Bessel beam, a beam having an intensity distribution in which the side lobes are reduced in comparison to the intensity distribution of the Bessel beam, or other distributions. Further, when approximation according to Fraunhofer diffraction is performed, the intensity distribution on the surface to be scanned 5 is expressed as the Fourier-transformed image of the intensity distribution on the pupil. Therefore, it is possible to transform the light flux emitted from the light source 1 into the certain arbitrary intensity distribution by which the intensity distribution on the pupil becomes the inverse-Fourier-transformed image of a desired intensity distribution on the surface to be scanned 5.

Accordingly, by using the intensity-distribution transforming unit 7, in comparison to the case where the intensity distribution is not transformed, it is possible to reduce the diameter of the beam spot, and to generate a beam having an increased depth of focus, and reduced side lobes.

FIGS. 12A, 12B and 12C show a concept of general intensity-distribution transformation. For example, when a parallel light flux having the intensity distribution (A) (shown in FIG. 12B) is incident on the intensity-distribution transforming unit 7, although the light flux emitted via the intensity-distribution transforming unit 7 is still a parallel light flux (as shown in FIG. 12A), the intensity distribution thereof (B) (shown in FIG. 12C) is different from the intensity distribution (A). Such an optical component for transforming the intensity distribution of a light flux is called an intensity-distribution transforming component. In the example shown in FIGS. 12A, 12B and 12C, the light flux is transmitted by the intensity-distribution transforming unit 7 such that each of the incident light flux and emitting light flux is the parallel flux. However, when the light flux is a divergent light flux, the intensity distribution thereof is transformed by the intensity-distribution transforming unit 7. Similarly, when the light flux is a convergent light flux, the intensity distribution thereof is transformed by the intensity-distribution transforming unit 7.

Figure 13A:
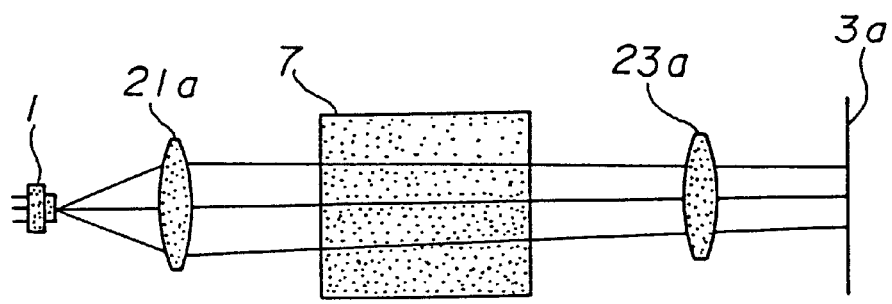
FIGS. 13A and 13B show one example of a first optical system which can be used in the fifth preferred embodiment of the present Invention.
Figure 13B:
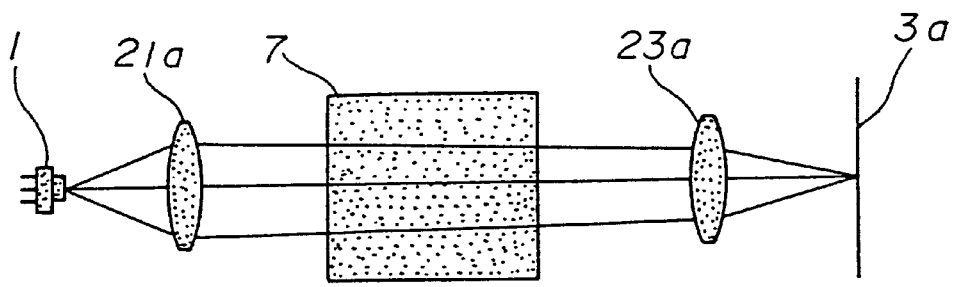

FIG. 13A shows the sectional view of the first optical system 2 in one example which can be used in the optical scanning device In the fifth preferred embodiment of the present invention taken along the deflection plane, and FIG. 13B shows the sectional view of the same first optical system 2 taken along the plane including the optical path of the light flux and perpendicular to the deflection plane.

In this first optical system 2, the light flux emitted from a light source 1 is coupled by an optical component 21a for coupling, then, the intensity distribution of the light flux emitted from the light source 1 is transformed by an intensity-distribution transforming unit 7 including at least one intensity-distribution transforming component, and, then, the light flux is converged, at least in a direction perpendicular to the deflection direction, by an optical component 23a for converging, in proximity to a deflective reflection surface 3a of an optical deflecting unit 3. At this time, the intensity distribution of the light flux emitting from the optical component 21a for coupling is different from the intensity distribution of the light flux incident on the optical component 23a for converging. Although the light flux from the light source 1 is transformed into the weakly convergent light flux by the optical component 21a for coupling in this example, it is also possible to use the first optical system 2 in the fifth preferred embodiment of the present invention, in which system the optical component 21a for coupling transforms the light flux from the light source 1 into a parallel light flux. It is also possible to use the first optical system 2 in the fifth preferred embodiment of the present invention, in which system the optical component 21a for coupling transforms the light flux from the light source 1 into a weakly divergent light flux.

Thus, as a result of transforming the intensity distribution of the light flux emitted from the light source 1 using the intensity-distribution transforming unit 7 so that a desired Intensity distribution can be obtained on the surface to be scanned, it is possible to obtain the optical scanning device by which it is possible to reduce the diameter of the beam spot without reducing the quantity of light, and, also, to reduce the side lobes with increasing the depth of focus.

The intensity-distribution transforming component of the intensity-distribution transforming unit 7 can be obtained by using a method proposed by K. M. Iftekharuddln et al. or other methods. This method for designing a lens for transforming the intensity distribution is disclosed by K. M. Iftekharuddln et al. ("Gaussian-to-Sessel Beam Transformation Using A Split Refracting System", APPLIED OPTICS/Vol. 32, No. 13/May 1, 1993, page 2252), for example. According to this document, a parallel flux having a Gaussian distribution is transformed into a light flux having an intensity distribution (Bessel beam) in proportion to the second power of the zero-order Bessel beam of the first kind via two piano-convex lenses, and the thus-obtained light flux emits therefrom as a parallel flux. Each of the shapes of the convex surfaces of the piano-convex lenses is a shape of an aspherical surface approximately expressed by a polynominal.

In this designing method, simultaneous equations should be solved so as to fulfill designing conditions, and there is a case where the strict solution thereof cannot be achieved. In this case, a solution can be obtained through approximation by using an approximate expression, through numerical stimulation. In a case where the strict solution is obtained, it is possible to approximate the solution using an approximate expression. This is because, in order to enable easy working and evaluation, it is preferable that each lens surface is expressed by an expression (an expression (c) or an expression (d), described later) of a shape of a continuous surface which is used for ordinary working and evaluation.

Further, as described above, it is possible to increase the degree of freedom in designing of the second optical system 4 by transforming the light flux from the light source 1 into the weakly convergent light flux or weakly divergent light flux through the optical component 21a. However, in the first optical system in a common optical scanning device, a light flux from a semiconductor laser acting as a light source is transformed into an approximately parallel light flux by a collimating lens, then the light flux is converged in proximity to an optical deflecting portion by a cylindrical lens having power in the direction perpendicular to the deflection plane.

Figure 14A:
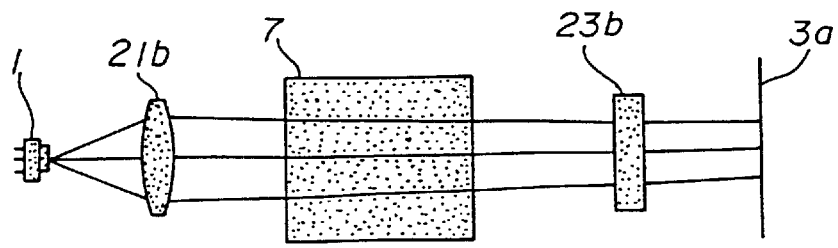
FIGS. 14A and 14B show another example of the first optical system which can be used in the fifth preferred embodiment of the present Invention.
Figure 14B:
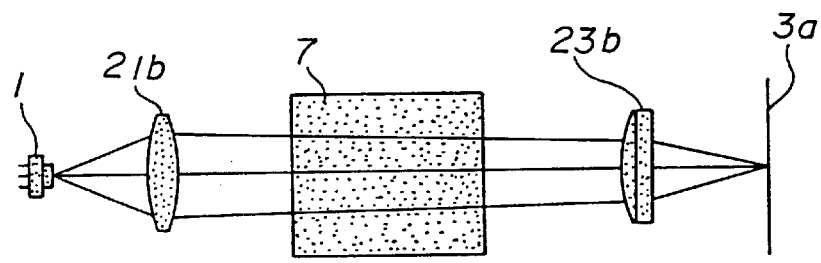
Figure 15A:
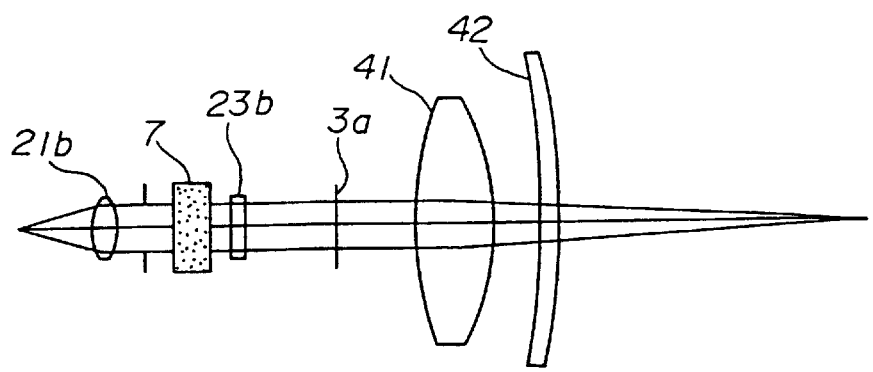
FIGS. 15A and 15B show one example of an optical arrangement of the optical scanning device in the fifth preferred embodiment of the present invention.
Figure 15B:
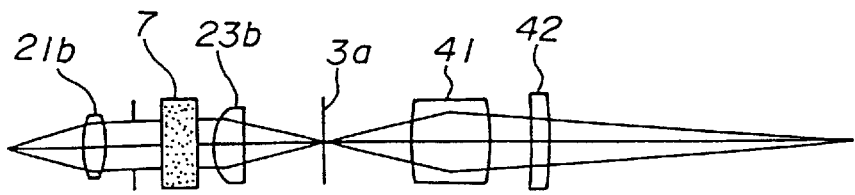

FIGS. 14A, 14B, 15A and 15B show an example of the optical system of the optical scanning device in the fifth preferred embodiment of the present invention, in which the first optical system includes a collimating lens, a cylindrical lens and the intensity-distribution transforming unit 7. FIG. 14A shows the sectional view of the first optical system 2 which can be used in the optical scanning device in the fifth preferred embodiment of the present invention taken along the deflection plane, and FIG. 14B shows the sectional view of the same first optical system 2 taken along the plane including the optical path of the light flux and perpendicular to the deflection plane. In FIGS. 15A and 15B, the optical scanning device is shown in a condition in which the optical scanning device is expanded along the optical path of the light flux extending from the light source to the surface to be scanned. FIG. 15A shows the sectional view of the optical scanning device taken along the deflection plane, and FIG. 15B shows the sectional view of the optical scanning device taken along the plane including the optical path of the light flux and perpendicular to the deflection plane.

The intensity-distribution transforming unit 7 is inserted between the collimating lens 21b and cylindrical lens 23b in the first optical system 2. The intensity-distribution transforming unit 7 transforms the parallel light flux having the intensity distribution (Gaussian distribution when the light source 1 is a semiconductor laser) into a parallel light flux having a different intensity distribution. By arranging the optical system as described above, it is possible to change the intensity distribution on the surface to be scanned, reduce the diameter of the optical beam and reduce the side lobes while increasing the depth of focus though the very simple arrangement. Thus, the optical system is very advantageous. Further, it is possible to recycle an optical scanning device in the related art, improve the characteristics of image formation, and, thus, obtain the above-described arrangement according to preferred embodiments of the present invention. Further, it is possible to apply the above-described concept (insertion of the group of Intensity-distribution transforming components between the collimating lens and cylindrical lens) according to preferred embodiments of the present invention to various optical scanning devices in common.

Use of an axially symmetric spherical lens as the intensity-distribution transforming component of the intensity-distribution transforming unit is advantageous in a designing aspect and a working aspect.

Generally, the axially symmetric aspherical lens is a lens having a surface shape, expressed by the following equation, on each of both sides thereof.

$$Z(H) = CH^2/[1+\sqrt{1-(1+K)(CH)^2}] + A_4H^4 + A_6H^6 A_8H^8 + A_{10}H^{10}+ \quad (c)$$

where:
X: the coordinate in the direction (sub-scanning direction) perpendicular to the deflection plane:
Z; the coordinate in the direction of the optical axis;
Y: the coordinate In the direction (main scanning direction) perpendicular to the X axis and also perpendicular to the Z axis;
C: a paraxial curvature;
H=$\sqrt{X^2+Y^2}$: a lens height;
K: a cone constant; and
$A_4, A_6, A_8, A_{10}, \ldots$ : constants.

Figure 16:
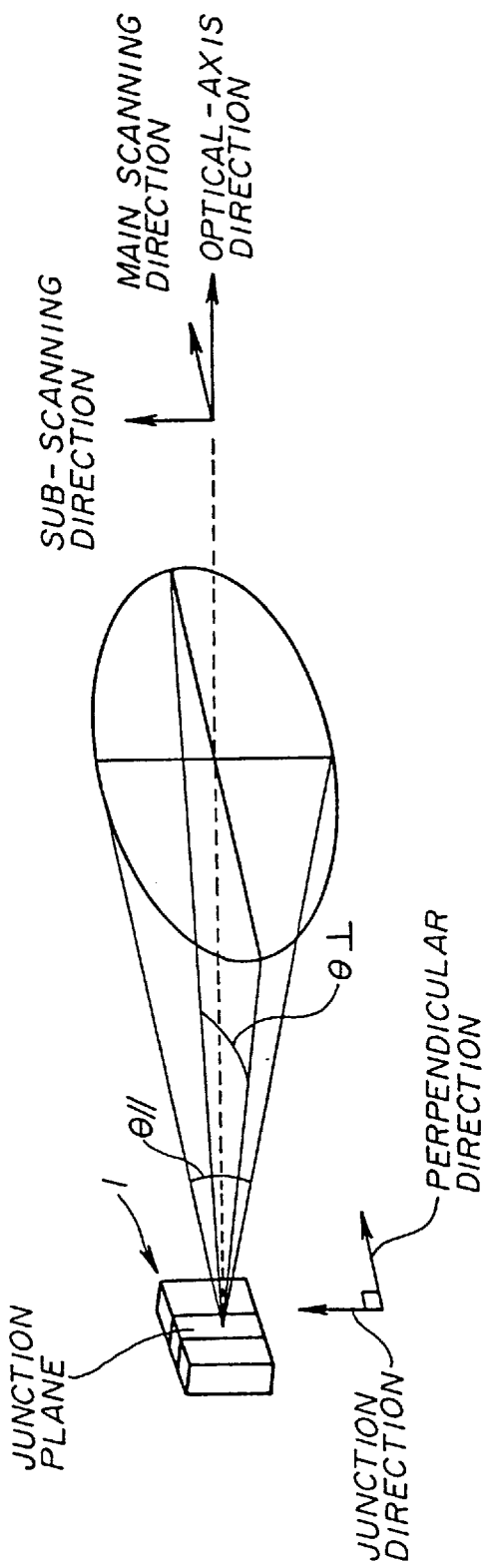
FIG. 16 shows a perspective view showing the diverging angles of a light flux in a case where a semiconductor laser is used as a light source.

The shape of each section of the above-mentioned axially symmetric aspherical lens taken along a plane including the optical axis is a non-circular arc shape, and this lens is axially symmetric with respect to the optical axis. Therefore, when a light source such as a semiconductor laser, as shown in FIG. 16, in which the diverging angle in the junction direction of the junction plane is different from that in the direction perpendicular to the junction direction is used, the intensity distribution of the light flux in the image-formation condition is not axially symmetric. For obtaining an axially symmetric intensity distribution in the image-formation condition, a special toric lens is used instead of the above-mentioned axially symmetric aspherical lens. FIG. 17A shows the first optical system 2 in which a special toric lens in the form of a single lens is used as the intensity-distribution transforming component.

When the semiconductor laser shown in FIG. 16 is used as the light source 1, the intensity distribution shown in FIG. 17B in the direction (sub-scanning direction) perpendicular to the deflection plane can be transformed into the intensity distribution shown in FIG. 17C through the axially symmetric aspherical lens. Further, the intensity distribution shown in FIG. 17D in the direction (main scanning direction) parallel to the deflection plane and perpendicular to the optical path of the light flux is different from the intensity distribution shown in FIG. 17B, and the intensity distribution shown in FIG. 17E obtained as a result of the intensity distribution shown in FIG. 17D being transformed through the axially symmetric aspherical lens is different from the intensity distribution shown in FIG. 17C. Therefore, by using the special toric lens 26, the sectional view of which taken along the deflection plane is different from the sectional view of which taken along the plane perpendicular to the deflection plane and including the optical axis thereof, it is possible to transform the intensity distribution shown in FIG. 17B into the intensity distribution shown in FIG. 17C, and, also, to transform the intensity distribution shown in FIG. 17D into the intensity distribution shown in FIG. 17F the same as the intensity distribution shown in FIG. 17C.

Further, other than the above-mentioned example, it is also possible to use the special toric lens in a case where the intensity distribution of a light flux is intended to be transformed arbitrarily.

The special toric lens is a lens having the surface shape expressed by the following equations on at least one side thereof, for example:

$$C_m(Y) = C_{mO} + b_{O1}Y + b_{O2}Y^2 + b_{O3}Y^3 + b_{O4}Y^4 + b_{O5}Y^5 + \ldots$$

$$K_x(Y) = c_{OO} + c_{O1}Y + c_{O2}Y^2 + c_{O3}Y^3 + c_{O4}Y^4 + c_{O5}Y^5 + \ldots$$

$$Z(X, Y) = C_{mO}Y^2 / \left[1 + \sqrt{[1 - (1 + a_{OO})(C_{mO}Y)^2]}\right] +$$
$$a_{O1}Y + a_{O3}Y^3 + a_{O4}Y^4 + a_{O5}Y^5 + \ldots +$$
$$C_m(Y)X^2 / \left[1 + \sqrt{(1 - (1 + K_x(Y))(C_s(Y)X)^2)}\right] +$$
$$(f_{OO} + f_{O1}Y + f_{O2}Y^2 + f_{O3}Y^3 + f_{O4}Y^4 + f_{O5}Y^5 + \ldots)X +$$
$$(g_{OO} + g_{O1}Y + g_{O2}Y^2 + g_{O3}Y^3 + g_{O4}Y^4 + g_{O5}Y^5 + \ldots)X^2 +$$
$$(h_{OO} + h_{O1}Y + h_{O2}Y^2 + h_{O3}Y^3 + h_{O4}Y^4 + h_{O5}Y^5 + \ldots)X^3 +$$
$$(i_{OO} + i_{O1}Y + i_{O2}Y^2 + i_{O3}Y^3 + i_{O4}Y^4 + i_{O5}Y^5 + \ldots)X^4 +$$
$$(j_{OO} + j_{O1}Y + j_{O2}Y^2 + j_{O3}Y^3 + j_{O4}Y^4 + j_{O5}Y^5 + \ldots)X^5 +$$
$$(k_{OO} + k_{O1}Y + k_{O2}Y^2 + k_{O3}Y^3 + k_{O4}Y^4 + k_{O5}Y^5 + \ldots)X^6 + \ldots$$

(d)

where:
X: the coordinate in the direction (sub-scanning direction) perpendicular to the deflection plane;
Z: the coordinate in the direction of the optical axis;
Y: the coordinate in the direction (main scanning direction) perpendicular to the X axis and also perpendicular to the Z axis;
$C_{mO}$: a parallel curvature in proximity to the optical axis in the deflection plane;
$C_{sO}$: a paraxial curvature in proximity to the optical axis in the plane perpendicular to the deflection plane and including the optical axis;
$C_s(Y)$: a paraxial curvature in the plane perpendicular to the deflection plane and parallel to the optical axis at the position Y in the direction (main scanning direction) perpendicular to the X axis and also perpendicular to the Z axis;
$K_x(Y)$: a cone constant expressing a quadratic surface in the plane perpendicular to the deflection plane and parallel to the optical axis at the position Y in the direction (main scanning direction) perpendicular to the X axis and also perpendicular to the Z axis;
$a_{mn}, b_{mn}, c_{mn}, f_{mn}, g_{mn}, h_{mn}, i_{mn}, j_{mn}, k_{mn}, \ldots$ :constants.

The above-mentioned axially symmetric aspherical lens and special toric lens can be manufactured as a result of recent improvements in the art, and improvement in techniques of cutting working, plastic molding and glass molding of an axis-less shape. Because these lenses are small, different from long optical components included in the second optical system, it is possible to work them at a relatively low cost.

Further, the above-mentioned intensity-distribution transforming unit may include only one intensity-distribution transforming component, or may include a plurality of intensity-distribution transforming components. However, it is more economical that the number of components included in the intensity-distribution transforming unit is small.

Thus, as a result of using a semiconductor laser, which emits the light flux having an approximately Gaussian distribution, as the light source, it is possible to achieve price reduction, to miniaturize the optical scanning device, and, also, to use components of the optical scanning device in the related art in common.

In an ordinary optical scanning device using a semiconductor laser as the light source, a Gaussian distribution is propagated onto the surface to be scanned. Thereby, the diameter (the diameter of the area in which the intensity is equal to or higher than $1/e^2$ of the peak intensity) of the beam spot on the surface to be scanned is expressed by the above-mentioned equation (b). As clear from the equation (b), when the intensity-distribution transforming unit used in the fifth preferred embodiment of the present invention is used in the ordinary optical scanning device, the wavelength $\lambda$ of the light flux emitted from the light source and the numerical aperture NA of the image-formation system do not change. However, it is possible to change the intensity distribution on the surface to be scanned from a Gaussian distribution to an intensity distribution in which the diameter of the beam spot is reduced, through the intensity-distribution transforming component. Thus, it is possible to easily reduce the diameter of the beam spot.

Figure 18:
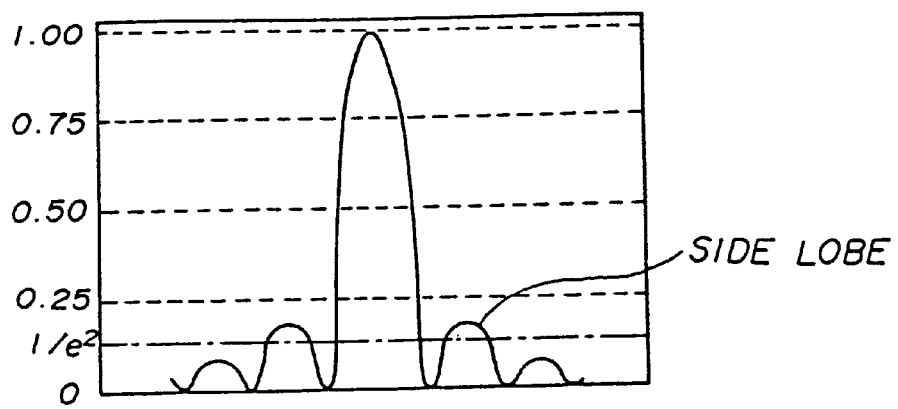
FIG. 18 is a graph showing the intensity distribution of a Bessel beam.
Figure 19:
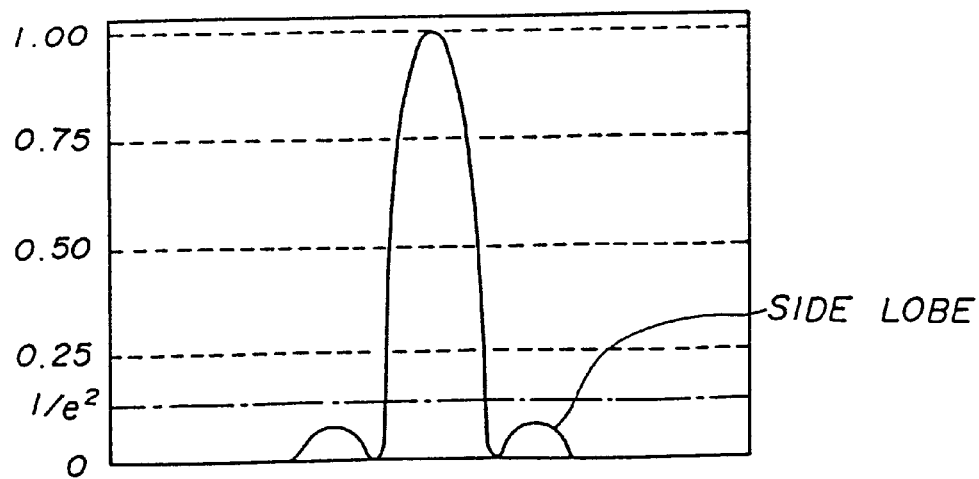
FIG. 19 is a graph showing the intensity distribution of a light flux obtained as a result of the Bessel beam being transformed through the intensity-distribution transforming optical system which can be used in the fifth preferred embodiment of the present invention.

As shown in FIG. 18, in a Bessel beam, although it is possible to reduce the diameter of the beam spot and increase the depth of focus, the intensity of the highest side lobe exceeds $1/e^2$ of the peak intensity. Thus, the side lobe is large. Thereby, depending on the process conditions of the image forming apparatus, the image quality is adversely affected. In order to avoid such a situation, the intensity distribution of the light flux is transformed into an intensity distribution by which the intensity distribution on the surface to be scanned is changed into an intensity distribution In which the intensity of the highest side lobe is lower than $1/e^2$ of the peak intensity, as shown in FIG. 19. Thus, it is possible to reduce the intensity of the highest side lobe and reduce the diameter of the beam spot easily. FIG. 19 shows the intensity distribution of the light flux on the surface to be scanned obtained as a result of the intensity distribution of the light flux being transformed by the intensity-distribution transforming component into one by which the intensity of the highest side lobe is reduced.

Figure 20:
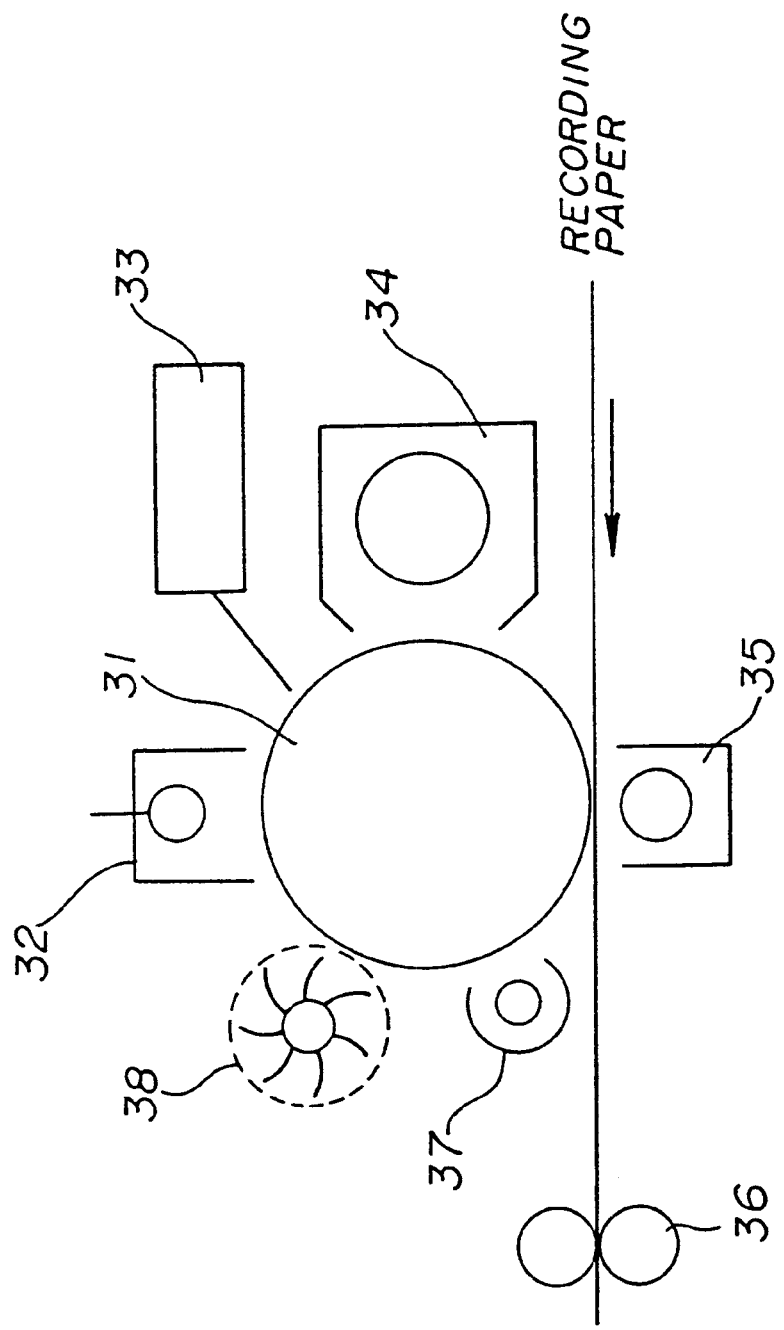
FIG. 20 shows a side-elevational view of an image forming apparatus in which the optical scanning device according to preferred embodiments of the present invention can be used.

FIG. 20 shows one example of an image forming apparatus. Around an image carrying body 31, a charging unit 32, an exposing unit 33, a developing unit 34, a transferring unit 35, a fixing unit 36, an electricity-removing unit 37, a cleaning unit 38 and so forth are arranged.

As a typical image forming process, an electrophotographic process is used. In the electrophotographic process, a light flux from an optical scanning device is incident on a photosensitive body used as the image carrying body 31 which is uniformly charged previously. Thereby, a latent image is formed on the photosensitive body (exposure). Then, toner is caused to adhere to the latent image so that a toner image is formed (development). The toner image is transferred onto recording paper (transfer). The toner of the transferred toner image is melted, and. thus, is caused to adhere to the recording paper as a result of being heated and pressed (fixing). Thus, the image is formed through such a series of steps.

By using each of the above-described optical scanning devices according to preferred embodiments of the present invention as the exposing unit 33 of the image forming apparatus, extremely high-quality images are achieved.

Further, the present invention is not limited to the above-described preferred embodiments and variations and modifications may be made without departing from the scope of the present invention.

The present application is based on Japanese priority application Nos. 11-048824 and 11-239828, filed on Feb. 25, 1999 and Aug. 26, 1999, respectively, the entire contents of which are hereby incorporated by reference.

What is claimed is:

1. An optical scanning device comprising:
   a coupling lens arranged to couple a light flux from a light source to form a parallel light flux, a convergent light flux or a divergent light flux;
   an optical deflector including a deflective reflection surface arranged to reflect the light flux from said coupling lens;
   a scanning image-formation optical system arranged to converge the deflected light flux from said optical deflector on a surface to be scanned to form a beam spot; and
   a depth increasing component arranged to increase the depth of focus determined by the entire optical system of said device and located along the optical path between said light source and said deflective reflection surface wherein said depth increasing component comprises an intensity-distribution transforming component arranged to transform the intensity distribution of the light flux such that the intensity distribution on the exit pupil is changed into one in which the intensity at four corners is higher than that at a central portion.

2. An optical scanning device comprising:
   coupling means for coupling a light flux from a light source to form a parallel light flux, a convergent light flux or a divergent light flux;
   optical deflecting means for reflecting the light flux from said coupling means via a deflective reflection surface thereof;
   scanning image-formation optical means for converging the deflected light flux from said optical deflecting means on a surface to be scanned to form a beam spot; and
   depth increasing means for increasing the depth of focus determined by the entire optical system of said device and located along the optical path between said light source and said deflective reflection surface wherein said depth increasing component comprises an intensity-distribution transforming component arranged to transform the intensity distribution of the light flux such that the intensity distribution on the exit pupil is changed into one in which the intensity at four corners is higher than that at a central portion.

3. An image forming apparatus comprising an optical scanning device which comprises:
   a coupling lens arranged to couple a light flux from a light source to form a parallel light flux, a convergent light flux or a divergent light flux;

an optical deflector having a deflective reflection surface arranged to reflect the light flux from said coupling lens;

a scanning image-formation optical system arranged to converge the deflected light flux from said optical deflector on a surface to be scanned to form a beam spot; and a depth increasing component arranged to increase the depth of focus determined by the entire optical system of said device and located along the optical path between said light source and said deflective reflection surface wherein said depth increasing component comprises an intensity-distribution transforming component arranged to transform the intensity distribution of the light flux such that the intensity distribution on the exit pupil is changed into one in which the intensity at four corners is higher than that at a central portion.

4. An image forming apparatus comprising an optical scanning device which comprises:

coupling means for coupling a light flux from a light source to form a parallel light flux, a convergent light flux or a divergent light flux;

optical deflecting means for reflecting the light flux from said coupling means via a deflective reflection surface thereof scanning image-formation optical means for converging the deflected light flux from said optical deflecting means on a surface to be scanned to form a beam spot; and depth increasing means for increasing the depth of focus determined by the entire optical system of said device and located along the optical path between said light source and said deflective reflection surface wherein said depth increasing component comprises an intensity-distribution transforming component arranged to transform the intensity distribution of the light flux such that the intensity distribution on the exit pupil is changed into one in which the intensity at four corners is higher than that at a central portion.

* * * * *